(12) United States Patent
Braunberger

(10) Patent No.: US 9,868,385 B2
(45) Date of Patent: *Jan. 16, 2018

(54) ABSOLUTE ACCELERATION SENSOR FOR USE WITHIN MOVING VEHICLES

(71) Applicant: Vision Works IP Corporation, Sequim, WA (US)

(72) Inventor: Fritz Braunberger, Sequim, WA (US)

(73) Assignee: Vision Works IP, Sequim, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,341

(22) Filed: May 23, 2016

(65) Prior Publication Data

US 2016/0264041 A1    Sep. 15, 2016

Related U.S. Application Data

(63) Continuation of application No. 14/340,453, filed on Jul. 24, 2014, now Pat. No. 9,371,002, which is a
(Continued)

(51) Int. Cl.
*G01C 21/00* (2006.01)
*B60Q 1/08* (2006.01)
(Continued)

(52) U.S. Cl.
CPC .............. *B60Q 1/08* (2013.01); *B60K 31/00* (2013.01); *B60Q 1/44* (2013.01); *B60Q 1/442* (2013.01);
(Continued)

(58) Field of Classification Search
CPC .................. B60C 1/08; B60K 31/00
See application file for complete search history.

(56) References Cited

U.S. PATENT DOCUMENTS 3,725,921 A    4/1973  Weidman et al.
3,846,749 A    11/1974 Curry
(Continued)

FOREIGN PATENT DOCUMENTS

DE    102005006528 A1    8/2004
JP          1107496 A    10/1973
(Continued)

OTHER PUBLICATIONS

Voevodsky, John, "Evaluation of a Deceleration Warning Light for Reducing Rear-End Automobile Collisions," Journal of Applied Psychology, 1974, vol. 59, No. 3, pp. 270-273.
(Continued)

*Primary Examiner* — Adam Alharbi
(74) *Attorney, Agent, or Firm* — Haverstock & Owens LLP

(57) ABSTRACT

A communication system for a vehicle comprises a mechanism for sensing a braking of the vehicle and a control device for sending a signal to a headlight activation circuit to modulate the vehicle's headlights based upon the braking of the vehicle. In particular, a headlight of the vehicle is able to be modulated based upon an application of one or both of a front brake and a rear brake. The headlight activation circuit is able to modulate the headlight between an on position and an off position or modulate the headlight between a high beam position and a low beam position. Consequently, the vehicle is better seen as it approaches likely congestion areas such as intersections and slowing or stopped traffic and attempts to enter traffic.

19 Claims, 31 Drawing Sheets

Related U.S. Application Data continuation-in-part of application No. 14/149,667, filed on Jan. 7, 2014, which is a continuation-in-part of application No. 14/012,854, filed on Aug. 28, 2013.

(51) Int. Cl.
| | |
|---|---|
| *B60K 31/00* | (2006.01) |
| *B60Q 1/44* | (2006.01) |
| *B60Q 9/00* | (2006.01) |
| *B62J 6/00* | (2006.01) |
| *B62J 6/02* | (2006.01) |
| *H05B 33/08* | (2006.01) |

(52) U.S. Cl.
CPC ............ *B60Q 1/447* (2013.01); *B60Q 9/008* (2013.01); *B62J 6/00* (2013.01); *B62J 6/02* (2013.01); *B60Q 2300/054* (2013.01); *B60Q 2300/114* (2013.01); *B60Q 2900/30* (2013.01); *B62J 2300/002* (2013.01); *B62K 2207/02* (2013.01); *H05B 33/0872* (2013.01)

(56) References Cited

U.S. PATENT DOCUMENTS

| | | | |
|---|---|---|---|
| 3,877,299 A | 4/1975 | Clayton | |
| 4,195,328 A | 3/1980 | Harris, Jr. | |
| 4,344,139 A | 8/1982 | Miller et al. | |
| 4,349,233 A | 9/1982 | Bullard et al. | |
| 4,361,871 A | 11/1982 | Miller et al. | |
| 4,402,142 A | 9/1983 | Dinsmore | |
| 4,515,124 A | 5/1985 | Hayashi | |
| 4,542,460 A | 9/1985 | Weber | |
| 4,779,696 A | 10/1988 | Harada et al. | |
| 4,976,330 A | 12/1990 | Matsumoto | |
| 5,017,904 A | 5/1991 | Browne et al. | |
| 5,314,037 A | 5/1994 | Shaw et al. | |
| 5,381,135 A | 1/1995 | Blount | |
| 5,453,662 A | 9/1995 | Gottlieb | |
| 5,473,306 A | 12/1995 | Adell | |
| 5,572,449 A | 11/1996 | Tang et al. | |
| 5,589,817 A | 12/1996 | Furness | |
| 5,594,414 A | 1/1997 | Namngani | |
| 5,617,199 A | 4/1997 | Dunne | |
| 5,678,650 A | 10/1997 | Ishihara et al. | |
| 5,770,999 A | 6/1998 | Rhodes | |
| 5,831,162 A | 11/1998 | Sparks et al. | |
| 5,856,620 A | 1/1999 | Okada | |
| 5,874,904 A | 2/1999 | Hirabayashi | |
| 6,020,814 A | 2/2000 | Robert | |
| 6,023,221 A | 2/2000 | Michelotti | |
| 6,073,070 A | 6/2000 | Diekhans | |
| 6,085,133 A | 7/2000 | Keuper et al. | |
| 6,097,156 A | 8/2000 | Diep | |
| 6,233,515 B1 | 5/2001 | Engleman et al. | |
| 6,298,931 B1 | 10/2001 | Easton | |
| 6,351,211 B1 | 2/2002 | Bussard | |
| 6,411,204 B1 | 6/2002 | Bloomfield et al. | |
| 6,417,764 B2 | 7/2002 | Tonkin | |
| 6,417,767 B1 | 7/2002 | Carlson et al. | |
| 6,459,369 B1 | 10/2002 | Wang | |
| 6,525,652 B2 | 2/2003 | Smith | |
| 6,556,908 B1 | 4/2003 | Lu et al. | |
| 6,600,414 B2 | 7/2003 | Foo et al. | |
| 6,647,328 B2 | 11/2003 | Walker | |
| 6,710,709 B1 | 3/2004 | Morin et al. | |
| 6,753,769 B1 | 6/2004 | Elliot | |
| 6,765,495 B1 | 7/2004 | Dunning et al. | |
| 6,802,573 B2 | 10/2004 | Eberling | |
| 6,850,156 B2 | 2/2005 | Bloomfield et al. | |
| 6,856,883 B2 | 2/2005 | Taylor | |
| 6,870,474 B1 | 3/2005 | Brothers | |
| 7,077,549 B1 | 7/2006 | Corliss | |
| 7,104,364 B2 | 9/2006 | Godlewsky et al. | |
| 7,239,953 B2 | 7/2007 | Braunberger | |
| 7,259,357 B2 | 8/2007 | Walker | |
| 7,412,329 B2 | 8/2008 | Urai et al. | |
| 7,418,345 B2 | 8/2008 | Diebold et al. | |
| 7,425,903 B2 | 9/2008 | Boss et al. | |
| 7,427,929 B2 | 9/2008 | Bauer et al. | |
| 7,529,609 B2 | 5/2009 | Braunberger et al. | |
| 7,548,173 B2 | 6/2009 | Tengler et al. | |
| 7,554,435 B2 | 6/2009 | Tengler et al. | |
| 7,782,227 B2 | 8/2010 | Boss et al. | |
| 8,000,871 B2 | 8/2011 | Braunberger et al. | |
| 8,155,847 B2 | 4/2012 | Wang | |
| 8,315,769 B2 | 11/2012 | Braunberger et al. | |
| 8,428,839 B2 | 4/2013 | Braunberger et al. | |
| 8,437,935 B2 | 5/2013 | Braunberger et al. | |
| 8,508,441 B2 | 8/2013 | Kimura | |
| 8,532,896 B2 | 9/2013 | Braunberger et al. | |
| 8,571,776 B2 | 10/2013 | Braunberger et al. | |
| 8,941,482 B1 * | 1/2015 | Gouverneur | B60Q 1/40 340/465 |
| 2001/0056544 A1 | 12/2001 | Walker | |
| 2002/0133282 A1 | 9/2002 | Ryan et al. | |
| 2002/0154514 A1 | 10/2002 | Yagi | |
| 2002/0171542 A1 | 11/2002 | Bloomfield et al. | |
| 2003/0006886 A1 | 1/2003 | Gabbard | |
| 2003/0039123 A1 | 2/2003 | Crisick | |
| 2003/0133306 A1 | 7/2003 | Kakizoe et al. | |
| 2003/0138131 A1 | 7/2003 | Stam | |
| 2003/0151502 A1 | 8/2003 | Kam | |
| 2003/0201885 A1 | 10/2003 | Currie | |
| 2004/0049324 A1 | 3/2004 | Walker | |
| 2004/0077459 A1 | 4/2004 | Hase | |
| 2004/0090314 A1 | 5/2004 | Iwamoto | |
| 2004/0105264 A1 | 6/2004 | Spero | |
| 2004/0139034 A1 | 7/2004 | Farmer | |
| 2004/0140143 A1 | 7/2004 | Saeki et al. | |
| 2004/0160315 A1 | 8/2004 | Speckhart et al. | |
| 2004/0167702 A1 | 8/2004 | Isogai et al. | |
| 2004/0215393 A1 | 10/2004 | Matsumoto | |
| 2004/0222918 A1 | 11/2004 | Kakishita et al. | |
| 2005/0004760 A1 | 1/2005 | Urai et al. | |
| 2005/0135081 A1 | 6/2005 | Ishiguro | |
| 2005/0141232 A1 | 6/2005 | Chon | |
| 2005/0156722 A1 | 7/2005 | McCall | |
| 2005/0156727 A1 | 7/2005 | Golder | |
| 2005/0162106 A1 | 7/2005 | Cho | |
| 2005/0200467 A1 | 9/2005 | Au | |
| 2005/0207619 A1 | 9/2005 | Lohmann | |
| 2005/0223762 A1 | 10/2005 | Yammamoto | |
| 2005/0232469 A1 | 10/2005 | Schofield | |
| 2005/0248446 A1 | 11/2005 | Watabe et al. | |
| 2006/0025897 A1 | 2/2006 | Shostak et al. | |
| 2006/0026017 A1 | 2/2006 | Walker | |
| 2006/0072914 A1 | 4/2006 | Arai et al. | |
| 2006/0074540 A1 | 4/2006 | Braunberger et al. | |
| 2006/0206246 A1 | 9/2006 | Walker | |
| 2007/0052530 A1 | 3/2007 | Diebold et al. | |
| 2007/0063824 A1 | 3/2007 | Gaddy | |
| 2007/0135979 A1 | 6/2007 | Plante | |
| 2007/0135980 A1 | 6/2007 | Plante | |
| 2007/0136078 A1 | 6/2007 | Plante | |
| 2007/0188348 A1 | 8/2007 | Bauer et al. | |
| 2007/0205882 A1 | 9/2007 | Erhlich et al. | |
| 2007/0219685 A1 | 9/2007 | Plante | |
| 2007/0233337 A1 | 10/2007 | Plishner | |
| 2007/0252723 A1 | 11/2007 | Boss et al. | |
| 2008/0082261 A1 | 4/2008 | Tengler et al. | |
| 2008/0091309 A1 | 4/2008 | Walker | |
| 2008/0111666 A1 | 5/2008 | Plante et al. | |
| 2008/0120175 A1 | 5/2008 | Doering | |
| 2008/0122603 A1 | 5/2008 | Plante et al. | |
| 2008/0122605 A1 | 5/2008 | Tengler et al. | |
| 2008/0122652 A1 | 5/2008 | Tengler | |
| 2008/0147266 A1 | 6/2008 | Plante et al. | |
| 2008/0147267 A1 | 6/2008 | Plante et al. | |
| 2008/0183344 A1 | 7/2008 | Doyen et al. | |
| 2008/0183825 A1 | 7/2008 | Alicherry et al. | |
| 2008/0288192 A1 | 11/2008 | Kumar et al. | |
| 2008/0316053 A1 | 12/2008 | Boss et al. | |
| 2009/0040073 A1 | 2/2009 | Bootes | |

(56) References Cited

U.S. PATENT DOCUMENTS

| | | |
|---|---|---|
| 2009/0118960 A1 | 5/2009 | Harrison |
| 2009/0125170 A1 | 5/2009 | Noffsinger et al. |
| 2009/0140887 A1 | 6/2009 | Breed |
| 2009/0147966 A1 | 6/2009 | McIntosh et al. |
| 2009/0157255 A1 | 6/2009 | Plante |
| 2009/0189756 A1 | 7/2009 | Wu |
| 2009/0242284 A1 | 10/2009 | Whetstone, Jr. |
| 2009/0242285 A1 | 10/2009 | Whetstone, Jr. |
| 2009/0261963 A1 | 10/2009 | Ault |
| 2010/0063736 A1 | 3/2010 | Hoetzer |
| 2010/0217507 A1 | 8/2010 | Braunberger et al. |
| 2010/0318258 A1 | 12/2010 | Katayama et al. |
| 2010/0332074 A1 | 12/2010 | Brigshella et al. |
| 2010/0332101 A1 | 12/2010 | Braunberger et al. |
| 2011/0050102 A1 | 3/2011 | Le Bars |
| 2011/0145042 A1 | 6/2011 | Green et al. |
| 2011/0199199 A1 | 8/2011 | Perkins |
| 2011/0210666 A1 | 9/2011 | Shiao |
| 2012/0155098 A1 | 6/2012 | Kasaba |
| 2013/0133306 A1* | 5/2013 | Qiu .................. F01D 19/00 60/39.091 |
| 2013/0184979 A1 | 7/2013 | Karandikar |
| 2014/0118132 A1 | 5/2014 | Braunberger et al. |
| 2014/0361687 A1 | 12/2014 | Olson et al. |
| 2015/0061492 A1 | 3/2015 | Braunberger |
| 2015/0062935 A1 | 3/2015 | Braunberger |
| 2015/0062936 A1 | 3/2015 | Braunberger |

FOREIGN PATENT DOCUMENTS

| | | |
|---|---|---|
| JP | 1030854 A | 2/1989 |
| JP | 1111550 A | 4/1989 |
| JP | 7137577 A | 5/1989 |
| JP | 1145247 A | 6/1989 |
| JP | 01173660 A | 7/1989 |
| JP | 06262978 A | 9/1994 |
| JP | 07205717 A | 8/1995 |
| JP | 08310296 A | 11/1996 |
| JP | 9039655 A | 2/1997 |
| JP | 2001030826 A | 2/2001 |
| JP | 2001206145 A | 7/2001 |
| JP | 2001213232 A | 8/2001 |
| JP | 2002240624 A | 8/2002 |
| JP | 2003200782 A | 7/2003 |
| JP | 2005096723 A | 4/2005 |
| JP | 2005145333 A | 6/2005 |
| JP | 2006182172 A | 7/2006 |

OTHER PUBLICATIONS

Moore et al., "Historical Development and Current Effectiveness of Rear Lighting Systems", Univ. Of Mich. 1999, pp. 1-80.
European Search Report from EP Application No. 07839779.1.

* cited by examiner

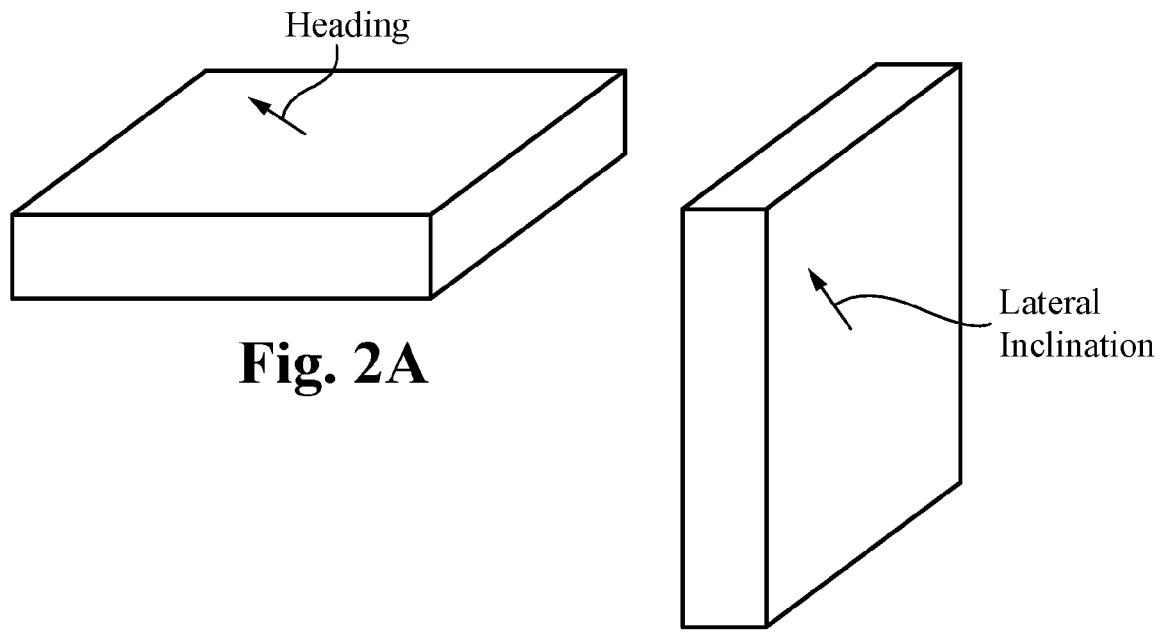
Fig. 2A
Fig. 2B
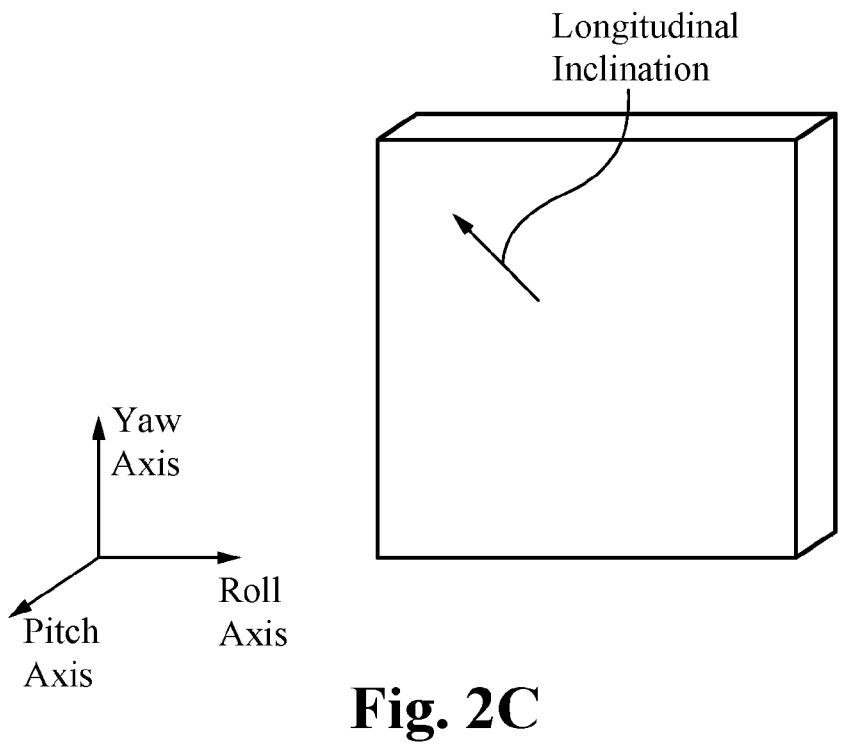
Fig. 2C

ABSOLUTE ACCELERATION SENSOR FOR USE WITHIN MOVING VEHICLES

RELATED APPLICATIONS

This Patent Application is a continuation of the U.S. patent application Ser. No. 14/340,453, filed Jul. 24, 2014, and entitled "ABSOLUTE ACCELERATION SENSOR FOR USE WITHIN MOVING VEHICLES," which is a continuation-in-part of the U.S. patent application Ser. No. 14/149,667, filed Jan. 7, 2014, and entitled "ABSOLUTE ACCELERATION SENSOR FOR USE WITHIN MOVING VEHICLES," which is hereby incorporated by reference in its entirety, which is a continuation-in-part of the U.S. patent application Ser. No. 14/012,854, filed Aug. 28, 2013, and entitled "ABSOLUTE ACCELERATION SENSOR FOR USE WITHIN MOVING VEHICLES," which is hereby incorporated by reference in its entirety.

FIELD OF THE INVENTION

The present invention relates generally to methods and devices for detecting absolute levels of longitudinal, lateral and vertical acceleration within moving vehicles, and to a variety of systems and methods for generating responses to changes in these absolute levels.

BACKGROUND OF THE INVENTION

Accelerometers find a wide variety of applications within modern motor vehicles. The most common of these are impact and collision sensors used to deploy front and side impact air bags in modern passenger cars and trucks.

In applications that depend on sudden and drastic deceleration, the presence of gravity is of little consequence and will not affect the implementation of the accelerometer. However, increasingly feedback systems within motor vehicles have attempted to make use of accelerometer data during much lower and subtler levels of acceleration.

One example is anti-collision warning systems. Though all street legal motor vehicles have brake lamps configured to signal other drivers of braking, these signals do not warn following drivers of imminent braking. At least one system has proposed activating a vehicle's brake lamp system in response to a deceleration signal from a sensitive accelerometer, and independent of actuation of the brake pedal. The system described in U.S. Pat. No. 6,411,204 to Bloomfield et al., entitled "DECELERATION BASED ANTI-COLLISION SAFETY LIGHT CONTROL FOR VEHICLE," includes a plurality of deceleration thresholds each with an associated modulation of the brake lamps.

However, the system fails to precisely account for gravitational forces, limiting its effectiveness to deceleration regimes where gravity's effect is minimal and reducing its effectiveness as an early warning system. Accelerometers, known as tilt sensors in the gaming and robotics industries, are extremely sensitive to any gravitational force to which they are not perpendicular. This sensitivity complicates any system that attempts to detect low levels of acceleration by using accelerometers within moving vehicles, since the system must account for the wide variety of orientations of the accelerometer relative to the earth's gravity introduced as the vehicle travels uphill, downhill, through cambered or off-camber curves, and on cambered grades. For instance, an accelerometer in a vehicle stopped on a 45-degree downhill slope would sense deceleration of a magnitude equal to 0.71 times the acceleration due to gravity. To avoid gravitational acceleration artifacts, the system of Bloomfield only produces output if the deceleration signal rises above a predetermined threshold set above the level of artifacts introduced during typical driving conditions.

However, the reliance of this device on a threshold deceleration reduces its effectiveness as an early warning system. Even a short delay between the time when the subject vehicle begins to slow down and the time when a following vehicle begins to slow can result in a rapid closure of the gap, or following distance, between the vehicles, and a potential collision. Consequently, the shorter the following distance between vehicles, the smaller the margin of error will be for drivers of following vehicles to avoid rear-end collisions. Disengaging the accelerator, or coasting, is often the first response of the driver of a subject vehicle to observing a non-urgent traffic event in the roadway ahead, and usually results in a slight deceleration. By failing to warn other drivers of the possible imminence of braking of a subject vehicle, the proposed device loses valuable time. To avoid this problem, the threshold must be set lower, which could result in gravitational acceleration artifacts affecting the system's output. For example, an overly low threshold could prevent the device from signaling deceleration on an uphill grade since the accelerometer would sense a component of the earth's gravity as acceleration. Similarly, a low threshold could cause the device to continuously flash during a descent, while gravity appears as deceleration.

The loss of time incurred by a threshold-based system might be tolerable in some other application; but in collision prevention, even an instant saved can prevent a collision. A Special Investigative Report issued in January of 2001 by the National Transportation Safety Board (NTSB) illustrates the scale of the problem. The report notes that in 1999 "1.848 Million rear-end collisions on US roads kill[ed] thousands and injur[ed] approximately [one] Million people." The report concluded that even a slightly earlier warning could prevent many rear-end collisions.

> Regardless of the individual circumstances, the drivers in these accidents were unable to detect slowed or stopped traffic and to stop their vehicles in time to prevent a rear-end collision. If passenger car drivers have a 0.5-second additional warning time, about 60 percent of rear-end collisions can be prevented. An extra second of warning time can prevent about 90 percent of rear-end collisions. [NTSB Special Investigative Report SIR-01/01, *Vehicle-and Infrastructure-based Technology for the Prevention of Rear-end Collisions*]

In some instances, a motor vehicle will remain running while parked or not in use, in an "idling" state. Common reasons for idling include waiting for a passenger, warming up the vehicle, listening to the radio and convenience. Motor vehicles that remain in an idling state pollute our environment unnecessarily. For example, thirty seconds of idling can use more fuel than turning off the engine and restarting it. Additionally, idling for ten minutes uses as much fuel as traveling five miles. Moreover, one hour of idling burns up to one gallon of fuel and can produce up to 20 lbs of carbon dioxide, which contributes to global warming. Passenger cars, fleet vehicles, diesel trucks, busses and taxi-cabs are all culprits in adding to pollution through unnecessary engine idle.

At present, over 30 states and 900 municipalities have adopted laws restricting the amount of time a stationary vehicle is allowed to idle before being turned off. These laws typically limit the allowable idling time from 1 to 6 minutes before the engine must be turned off and violations can range up to $1,000 per incident. Corporate and government fleet vehicles are most susceptible to such monetary penalties because the aggregate impact of many violations may reside within only one entity.

SUMMARY OF THE INVENTION

In this application "acceleration" refers to either or both positive acceleration and negative acceleration (sometimes called "deceleration"), while "deceleration" refers to only negative acceleration.

The present invention provides systems and methods for warning drivers of other vehicles of any possibility that a subject vehicle will brake and/or that the following vehicle may need to decelerate. This warning occurs earlier than warnings provided by traditional rear brake warning systems. Some embodiments of the present invention take advantage of the existing conditioning of modern drivers to respond quickly to rear brake warning lamps by using these systems to convey new deceleration warnings.

Some embodiments of the present invention relate to devices that overcome the limitations of the prior art by integrating the signals from pulse or sine wave generators, which are directly related to vehicle distance traveled per unit of time. These devices are commonly referred to as vehicle speed sensors (VSS). Most modern vehicles are shipped with an electronic VSS as standard equipment. The stock VSS communicates with the vehicle's electronic control module (ECM) and speedometer to display the speed of the vehicle to an operator. However, VSS can be installed as aftermarket add-ons.

The embodiments of the present invention involve using signals from a vehicle's VSS to detect deceleration of the vehicle, and modulating warning lights of the vehicle in response to the vehicle's deceleration. In some embodiments, the VSS emits a periodic function whose frequency corresponds to the vehicle's speed. For example, some embodiments of the present invention use a VSS that outputs a DC pulse with a frequency that corresponds to the speed of the vehicle. In addition, some embodiments of the present invention use a VSS that outputs an AC sine function with a frequency that corresponds to the speed of the vehicle.

A communication system for a vehicle comprises a mechanism for sensing a braking of the vehicle and a control device for sending a signal to a headlight activation circuit to modulate the vehicle's headlights based upon the braking of the vehicle. In particular, a headlight of the vehicle is able to be modulated based upon an application of one or both of a front brake and a rear brake. The headlight activation circuit is able to modulate the headlight between an on position and an off position or modulate the headlight between a high beam position and a low beam position. Consequently, the vehicle is better seen as it approaches likely congestion areas such as intersections and slowing or stopped traffic and attempts to enter traffic.

In one aspect, a communication system for a vehicle comprises a braking system engagement detector, a control device and a headlight activation circuit for activating a headlight, wherein the control device receives a signal from the braking engagement detector and sends a signal to the headlight activation circuit to operate the headlight based upon the signal from the braking engagement detector. In some embodiments, the braking system engagement detector detects an engagement of one or both of a front brake and a rear brake. In some embodiments, the headlight activation circuit modulates the headlight between an on position and an off position. In further embodiments, the headlight activation circuit modulates the headlight between a high beam and a low beam position. In some embodiments, the headlight is modulated at a rate corresponding to the speed of the vehicle. In some embodiments, the control device sends a signal to the headlight activation circuit to modulate the headlight when a brake engagement is detected and the vehicle slows to a defined speed. In some embodiments, the communication system is installed as aftermarket-equipment. In further embodiments, the vehicle comprises a motorcycle.

In another aspect, a method of modulating a vehicle headlight comprises detecting that a brake of the vehicle have been applied and modulating a headlight of the vehicle based upon the application of the brake. In some embodiments, the method comprises detecting an engagement of one or both of a front brake and a rear brake. In some embodiments, the headlight is modulated between an on position and an off position. In further embodiments, the headlight is modulated between a high beam and a low beam position. In further embodiments, the headlight is modulated at a rate corresponding to the speed of the vehicle. In some embodiments, a control device sends a signal to the headlight activation circuit to modulate the headlight a when a brake engagement is detected and the vehicle slows to a defined speed. In some embodiments, the method is implemented within an aftermarket system. In some embodiments, the vehicle comprises a motorcycle.

BRIEF DESCRIPTION OF THE DRAWINGS

FIG. 2A illustrates a gyroscope positioned for measuring a heading, and included in an accelerometer-gyroscopic sensor in accordance with an embodiment of the present invention.

FIG. 2B illustrates a gyroscope positioned for measuring a lateral inclination, and included in an accelerometer-gyroscopic sensor in accordance with an embodiment of the present invention.

FIG. 2C illustrates a longitudinal inclination, and included in an accelerometer-gyroscopic sensor in accordance with an embodiment of the present invention.

DETAILED DESCRIPTION OF THE INVENTION

Figure 1A:
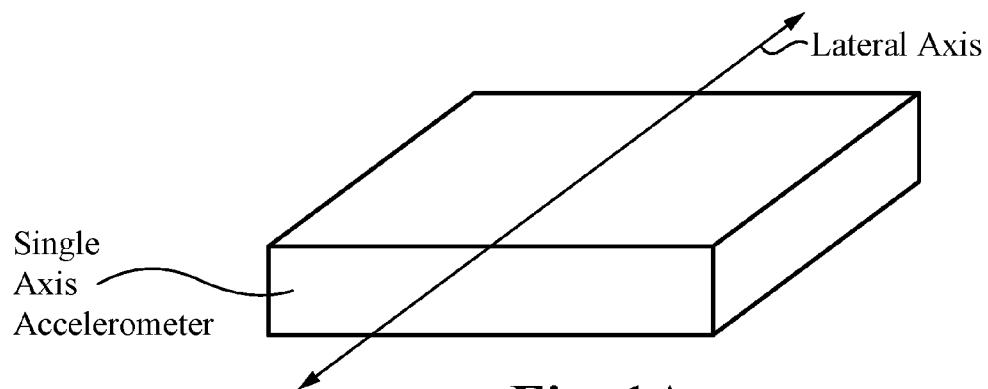
FIG. 1A illustrates a single axis accelerometer positioned for measuring lateral acceleration, and included in an accelerometer-gyroscopic sensor in accordance with an embodiment of the present invention.
Figure 1B:
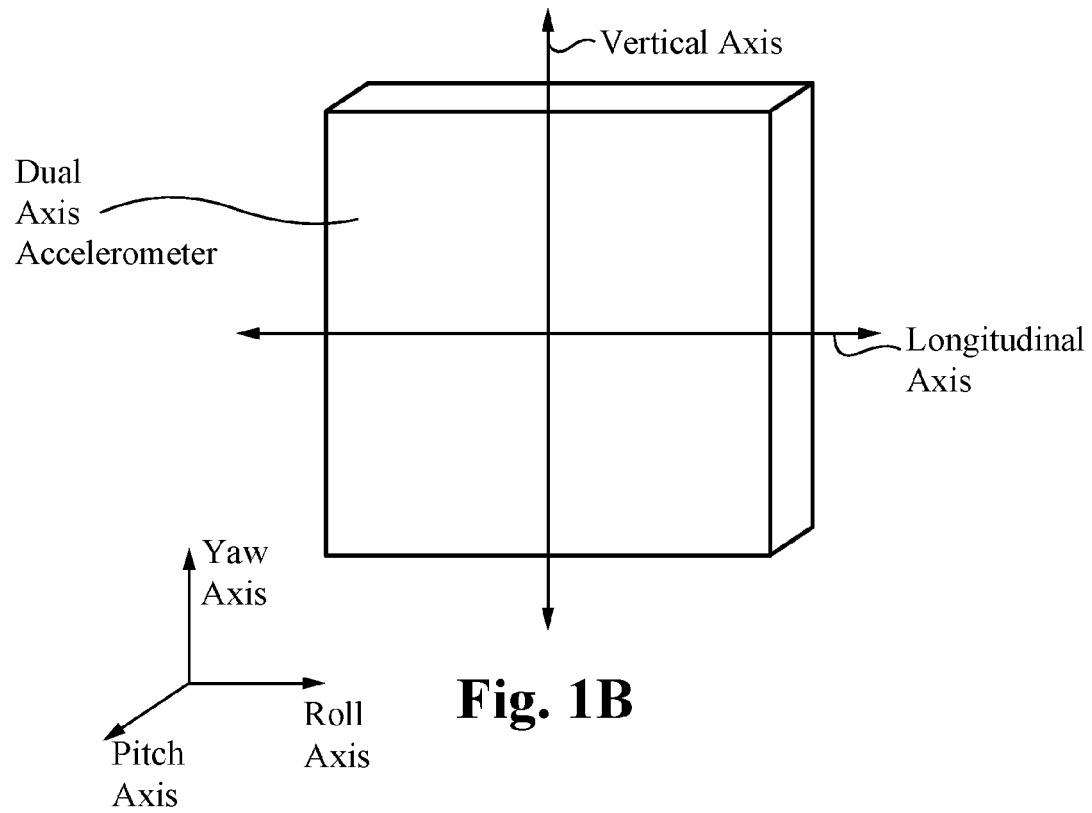
FIG. 1B illustrates a dual axis accelerometer positioned for measuring vertical and longitudinal acceleration, and included in an accelerometer-gyroscopic sensor in accordance with an embodiment of the present invention.

As shown in FIGS. 1B and 2C, one embodiment of the present invention includes a dual axis accelerometer and an electronic gyroscope positioned upon a moving body (not shown) having a pitch axis and a yaw axis that form a pitch-yaw plane as illustrated, which attempts to move along a movement vector orthogonal to the pitch-yaw plane. A first axis, termed the longitudinal axis, of the dual axis accelerometer is placed orthogonal to the plane of the pitch and yaw axes to sense acceleration along the movement vector. A second axis, termed the vertical axis, of the accelerometer is placed parallel with the yaw axis (and thus perpendicular to the movement vector) to sense acceleration along the yaw axis. Thus the two axes of the accelerometer form a longitudinal-vertical plane orthogonal to the pitch-yaw plane.

The gyroscope in FIG. 2C is mounted parallel to the longitudinal-vertical plane of the accelerometer and thus is also along a plane perpendicular to the pitch-yaw plane of the moving body. This configuration allows it to sense an inclination of the movement vector of the moving body relative to the gravitational acceleration acting on the body.

In some embodiments of the present invention, an accelerometer is used to detect additional types of movement. The orientation shown in FIG. 1A allows for detection of lateral acceleration. In FIG. 1A, a single axis accelerometer configured with a first axis, termed the lateral axis, parallel to the pitch axis senses lateral acceleration of the body, e.g. acceleration in a plane orthogonal to the longitudinal-vertical plane.

When the body does undergo a lateral acceleration, its actual movement is no longer along the desired movement vector. Thus, during lateral acceleration, another gyroscope can be included to sense the inclination of the component of the actual movement vector that lies along the lateral axis. FIG. 2B depicts a gyroscope configured parallel to the pitch-yaw plane and thus configured to detect an inclination of the component of movement that lies along the lateral axis, termed the lateral inclination of the body.

In some embodiments, the system also includes another gyroscope that is configured parallel to the lateral-longitudinal plane (in which all desirable movement vectors will lie), to detect a heading of the body. This additional gyroscope is required for those embodiments that supply supplemental data to navigation systems.

The embodiments of the present invention include logic circuits configured to receive signals of acceleration along the lateral, longitudinal, and vertical axes, as well as of the lateral and longitudinal inclinations and the heading, if necessary and to process these signals to produce a variety of output signals indicating characteristics of the moving body's movement. In some embodiments, these include: absolute longitudinal acceleration (both positive and negative), absolute vertical acceleration (both positive and negative), absolute lateral acceleration (both positive and negative), heading, and actual speed.

Though accelerometers are inherently stable, and especially so when internally temperature compensated, gyroscopes, both mechanical and electronic, can suffer from instability and drift. Because of these drift characteristics, gyroscopes typically require periodic auto-zeroing or re-referencing to provide reliable output.

In some embodiments of the present invention, a method of detecting an absolute deceleration includes steps of re-referencing. This task is able to be accomplished using signals from the accelerometers, but in other embodiments use a Hall effect, electronic or other type of compass.

Re-referencing is able to take place periodically; for systems using Hall effect or some other independent compass, the systems simply re-reference at specified heading or timing intervals. However, in some embodiments, systems that use accelerometer data for re-referencing are more careful. When stationary, any signal from the accelerometer is essentially representative of the earth's gravity, this signal can provide an initial reference for any gyroscopes included in the present invention, which is able to take place prior to movement of the body.

Once the body has begun moving, without periodic re-referencing, the gyroscope output can become unreliable. The present invention teaches several methods of re-referencing during travel. Some of these are only applicable to travel that includes periodic stops. For example, the vertical or lateral axis accelerometers can be used to detect whether the body is stopped. When it is stopped, the signal from the longitudinal axis of the accelerometer can be used to re-reference the gyroscope. Further, at any point during travel when no acceleration has been detected for a predetermined period of time the gyroscope can be re-referenced. In this way repeated referencing can occur even during extended travel without any stops.

In some embodiments, the present invention is implemented in a vehicle, and the following embodiments of the present invention are described relative to a vehicle. However, the methods and systems taught by the present invention can be implemented in a wide variety of moving bodies other than vehicles.

Example 1: Rear End Collision Avoidance

Figure 3A:
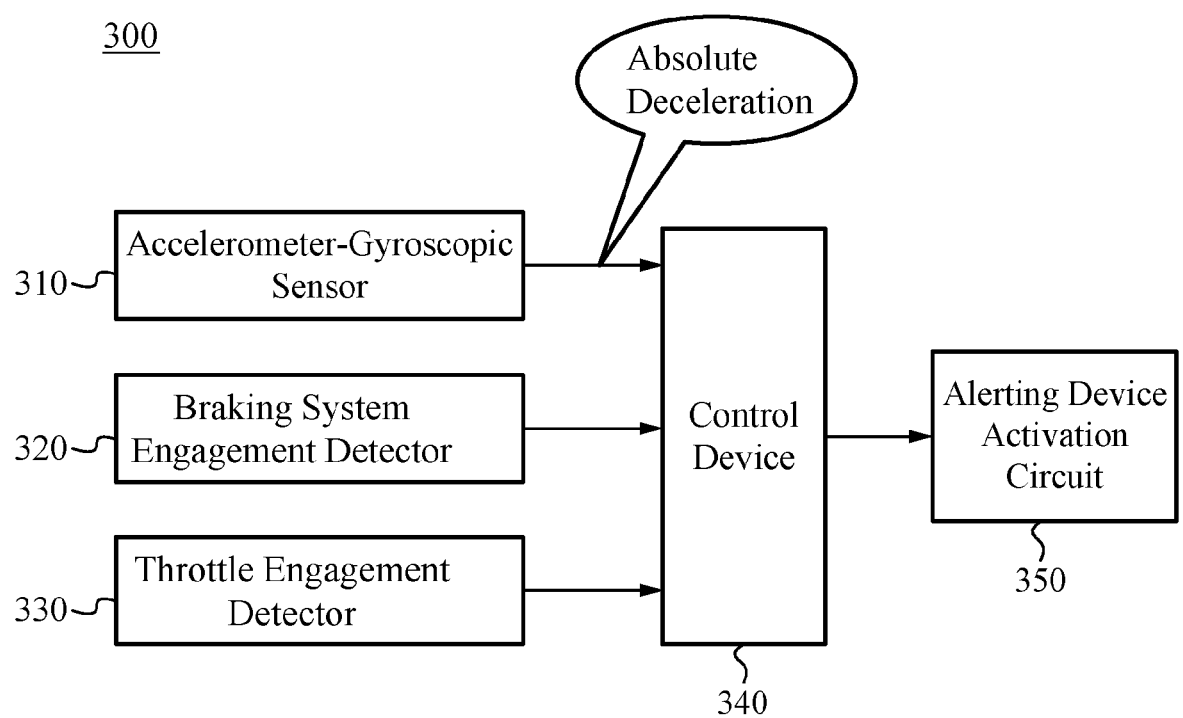
FIG. 3A is a schematic view illustrating the components of the rear-end collision avoidance system, warning drivers of a subject vehicle's deceleration, in accordance with an embodiment of the present invention.

FIG. 3A is a schematic view illustrating the components of the rear-end collision avoidance system 300, warning drivers of a subject vehicle's deceleration, in accordance with one embodiment of the present invention. The rear-end collision avoidance system 300 comprises an accelerometer-gyroscopic sensor 310, a braking system engagement detector 320, a throttle engagement detector 330, and a control device 340. The accelerometer-gyroscopic sensor 310 is coupled to the control device 340, detects an absolute longitudinal deceleration of the vehicle, and sends a signal to the control device 340. The braking system engagement detector 320 is also coupled to the control device 340, detects any engagement of the braking system of the vehicle, and sends a signal to the control device 340. The throttle engagement detector 330 is also coupled to the control device 340 and detects engagement of the throttle. In alternative embodiments, the present invention also includes additional input devices, such as a clutch engagement detector configured to relay a clutch status to the control device 340. Next, the control device 340 processes the input signals it receives from the accelerometer-gyroscopic sensor 310, the braking system engagement detector 320, and the throttle engagement detector 330 and decides whether to activate an alerting device of the vehicle. In some embodiments the control device 340 only activates an alerting device if the vehicle is throttled down but not braking. In some embodiments, the control device 340 activates the alerting device only if the absolute longitudinal deceleration is non-zero. In one embodiment, the communication system further comprises an alerting device activation circuit 350, wherein the control device 340 is coupled to and sends signals to the alerting device activation circuit 350, which activates an alerting device based on a signal from the control device 340.

Figure 9:
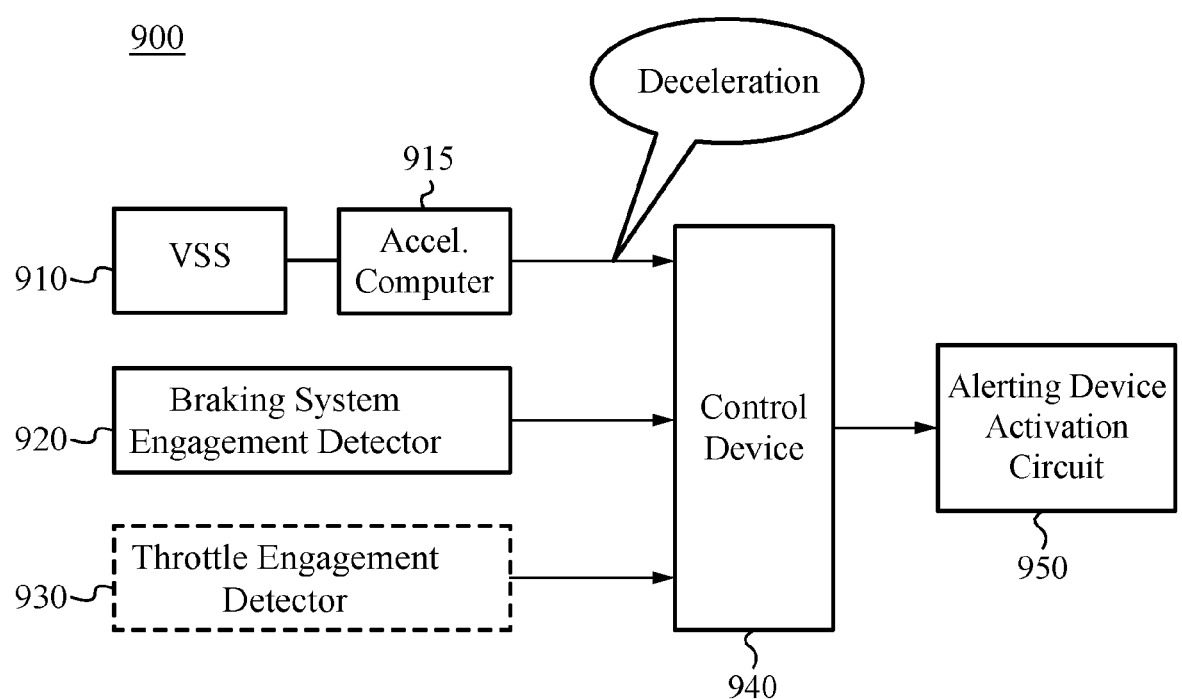
FIG. 9 is a schematic view illustrating the components of the rear-end collision avoidance system, warning drivers of a subject vehicle's deceleration, in accordance with some embodiments of the present invention.

In some other embodiments, input from a vehicle speed sensor (VSS) is used to perform a similar function. FIG. 9 is a schematic view illustrating the components of the rear-end collision avoidance system 900, warning drivers of a subject vehicle's deceleration, in accordance with one embodiment of the present invention. The rear-end collision avoidance system 900 comprises a vehicle speed sensor 910, an acceleration monitoring system 915, a braking system engagement detector 920, and a control device 940. It can also include a throttle engagement detector 930.

The vehicle speed sensor 910 is coupled to the acceleration monitoring system 915, which is coupled to the control device 940. The vehicle speed sensor 910 detects a speed of the vehicle and emits a periodic function with a frequency that is correlated to the speed of the vehicle. The acceleration monitoring system 915 uses variations in the periodic function to calculate the acceleration (or deceleration) of the vehicle. The acceleration monitoring system 915 sends a signal to the control device 940 that represents deceleration of the vehicle. The braking system engagement detector 920 is also coupled to the control device 940, detects any engagement of the braking system of the vehicle, and sends a signal to the control device 940. If present, the throttle engagement detector 930 is also coupled to the control device 940 and detects engagement of the throttle. In alternative embodiments, the present invention also includes additional input devices, such as a clutch engagement detector configured to relay a clutch status to the control device 940. Next, the control device 940 processes the input signals it receives from the acceleration monitoring system 915, the braking system engagement detector 920, and the throttle engagement detector 930 and decides whether to activate an alerting device of the vehicle. In some embodiments the control device 940 only activates an alerting device if the vehicle is throttled down but not braking. In some embodiments, the control device 940 activates the alerting device only if the absolute longitudinal deceleration is non-zero. In one embodiment, the communication system further comprises an alerting device activation circuit 950, wherein the control device 940 is coupled to and sends signals to the alerting device activation circuit 950, which activates an alerting device based on a signal from the control device 940.

Some embodiments use a microprocessor or micro-controller as the acceleration monitoring system 915 to measure pulse width differentials between consecutive pulses. If the periodic function produced by the VSS is a DC pulse, only one wire is needed to interface with the VSS 910. If the periodic function is an AC sine wave two wires are used.

The functions of an embodiment illustrated with reference to FIG. 9 are performed in a module that contains various discrete electronic components involved in signal conditioning as well as a microprocessor or microcontroller, which would actually do the computations. These include one or more of the following: a microprocessor, interpreter, voltage regulator, RAM, EEPROM, resonator and communication port and circuitry along with various filtering and voltage protection circuitry. In some embodiments, the module is capable of accurately measuring and comparing pulse widths of 1 millionth of a second or less and frequencies of zero (0) to mega hertz all within time frames of micro to milliseconds. The present invention can be implemented in an analog, electromechanical, or a digital circuit including programmable elements.

In addition, in some embodiments the various embodiments described above are implemented in a module that includes a separate aftermarket VSS. These embodiments are advantageous when used to retrofit older vehicles that do not come with a VSS as original equipment.

In addition, some embodiments use an aftermarket VSS, even on newer vehicles. For example, one such VSS comprises a sensor configured to detect rotation of the universal joint of a motor vehicle.

In this embodiment, a sensor is mounted on either the rear-end housing or on the back end of the transmission and where the sensor is positioned over the universal joint. The sensor would not be in contact with the spinning universal joint but in close proximity, e.g. ⅛ or ¼ inch air gap.

In some embodiments, the sensor is configured to sense ferrous metal. Thus, there is no need to affix anything to the actual spinning universal joint. Universal joint typically have four protrusions. The sensor is optionally configured to sense either two or four of the protrusions. The resultant signal represents variations in the magnetic flux field produced by the sensor each time a protrusion passes through the magnetic field.

One type of sensor used in some embodiments of the present invention comprises a coil with or without a core. When a voltage is applied to the coil, a magnetic flux field is produced around the coil. If a ferrous metal object passes through that field it robs just a little of the power (which is stored in the field) resulting in a change in the current and voltage within the coil and conductor feeding the coil. This signal is then used to produce a square wave.

The embodiments of the present invention include input devices. Those mentioned above include braking system engagement detectors, throttle engagement detectors, the accelerometer-gyroscopic sensor, and VSS/acceleration monitoring systems. In alternative embodiments, the present invention also includes additional input devices, such as a clutch engagement detector configured to relay a clutch status to the control device.

The embodiments of the presently claimed invention include alerting devices. In some embodiments, an alerting device comprises lamps on the vehicle that are capable of flashing and emitting visible light. In one aspect, the lamps of the alerting device flash only at a constant rate, while in another aspect the lamps flash at a variable rate, and further wherein the control device is configured to flash the lamps at a rate correlated to a rate of deceleration. In some embodiments, the lamps are one of the following: conventional signaling lamps and conventional brake lamps. However, in another embodiment, the alerting device is a radio frequency (RF) transmitter capable of directing RF signals from the rear of the vehicle to a following vehicle. In other embodiments, the alerting device uses other types of signals.

For example, in some other embodiments, the signaling lamps used comprise bi-color light emitting diodes (LED). In these embodiments, the bi-color LEDs change color depending on the polarity of the current used to energize them. Thus, the control device in these embodiments is configured to provide current to the bi-color LEDs with a polarity that varies depending on the signal to be sent. For example, in one embodiment the control device leaves the bi-color LEDs un-energized when no deceleration is occurring and the brakes are not engaged, provides a current with a polarity to cause the bi-color LEDs to emit a yellow light upon deceleration, and to provide a current with a polarity to cause the bi-color LEDs to emit a red light upon braking.

When used in this patent, the terms "conventional signaling lamps" and "conventional brake lamps" refer to signaling or brake lamps included on motor vehicles during their original manufacture. The present invention also contemplates signaling by using after-market devices that are attached to a vehicle in addition to conventional signaling and brake lamps.

A communication system can be embodied as an aftermarket add-on product or as an original vehicle system. These embodiments include different types of controllers. In some embodiments of an add-on system, a control device does not interfere with the existing brake lamp system controller. The control device communicates with the brake lamps in a substantially separate manner from the existing brake lamp control system. Control devices used in the present invention could include relays, switches or micro controllers. In one aspect, an aftermarket system can continuously power the alerting device activation circuit without need of an intermediate control device.

However, in an original equipment system, a communication system in accordance with the present invention is able to include a control device that further comprises a control system for the conventional brake lamp system, whereby the communication system is an integrated control and circuitry system for all brake lamps. In this aspect, a single control system accomplishes the tasks of conventional brake signaling and the signaling described in the present invention.

During operation, the communications system of the present invention uses information from the various input devices to determine a manner in which to operate an alerting device. In one aspect, the communications system continuously modulates the alerting device based on the accelerometer-gyroscopic sensor's input so long as the throttle is disengaged, regardless of braking system status. In another aspect, once the braking system is engaged, the communications system activates the alerting device continuously until disengagement of the braking system, whereupon the communications system once again considers throttle and the accelerometer-gyroscopic sensor's input in choosing a manner in which to operate the alerting device. In a third aspect, where a conventional braking system exists separately from a communications system as described in the present invention, the control device deactivates in response to braking system engagement and reactivates upon braking system disengagement. In some embodiments, the control device receives input in cycles and makes a determination for operation of the alerting device within each cycle.

In one embodiment, the control device 940 takes input from the acceleration monitoring system 915, the braking system engagement detector 920, and the throttle engagement detector 930 in cycles that are substantially continuous in time. In some embodiments, for each cycle, the control device 940 enters one of four states: I) it does not activate an alerting device for the entirety of the cycle, II) it activates an alerting device for the entirety of the cycle, III) it activates an alerting device at least once for a period of time that is short relative to the duration of the cycle; or IV) it activates an alerting device multiple times during the cycle.

Figure 3B:
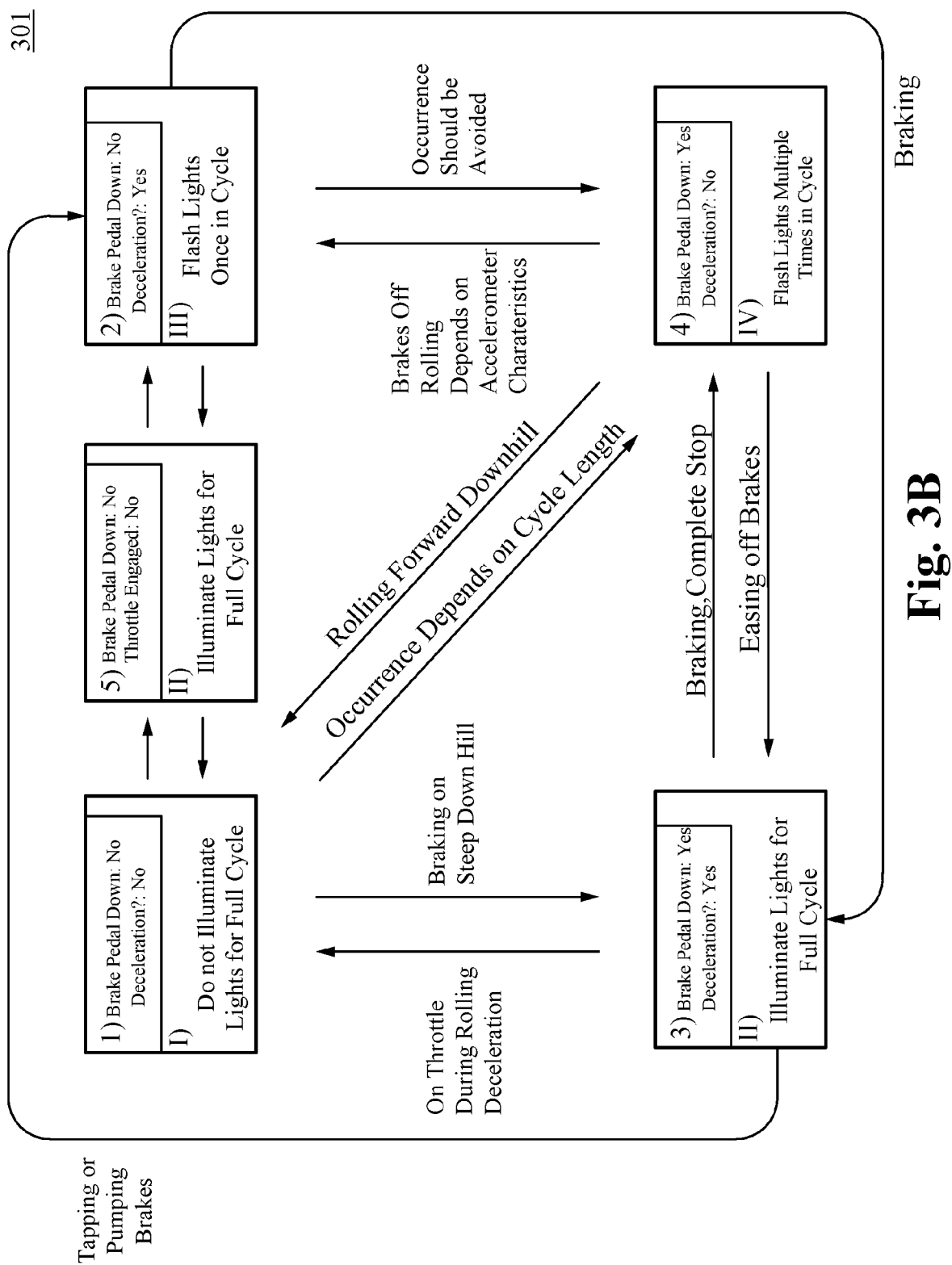
FIG. 3B illustrates a state machine diagram of the control device in accordance with some embodiments of the present invention.

FIG. 3B illustrates an embodiment in which these four output states are handled. A state machine 301, included in a control device in accordance with the present invention, takes five possible input states, for four of them throttle status is not considered: 1) brake pedal is not depressed, deceleration is not detected; 2) brake pedal is not depressed, deceleration is detected; 3) brake pedal is depressed, deceleration is detected; or 4) brake pedal is depressed, deceleration is not detected. State 5) only occurs if the throttle is disengaged, and if the brake pedal is not depressed. Input state 1 corresponds to output state I, input state 2 corresponds to output state III, input states 3 and 5 correspond to output state II, and input state 4 corresponds to output state IV.

Transitions between all input states are handled and every transition is a plausible outcome of a braking or acceleration event. For example, a driver disengaging the throttle pedal causes a transition from state 1 to state 5. In the first cycle detecting state 5, the brake lamps are illuminated. Once a required level of deceleration is detected, a transition from state 5 to state 2 occurs. In the first cycle detecting state 2, the brake lamps are flashed, or another alerting device is activated, corresponding to output state III. A transition from state 1 directly to state 2 can occur when beginning ascent of a steep grade: the throttle is engaged, the brake pedal is disengaged but the vehicle begins to decelerate.

If the driver engages the throttle again, or in the case of an ascent, increases the throttle, a transition from state 5 to state 1, or state 2 to state 1, occurs. If the driver subsequently depresses the brake pedal, a transition from state 2, or state 5, to state 3 occurs. While the brake pedal is depressed, state II output keeps the brake lamps illuminated. Furthermore, while the brake pedal is depressed, a transition from state 3 to state 4 may occur. In this embodiment, in state 4 the lamps are flashed at an increased rate. Whenever the brake pedal is depressed, state II or IV output occurs and accelerometer-gyroscopic sensor data is effectively ignored. When the brake pedal is released, one of input state 1, input state 2, and input state 5 are entered.

A transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

Figure 3C:
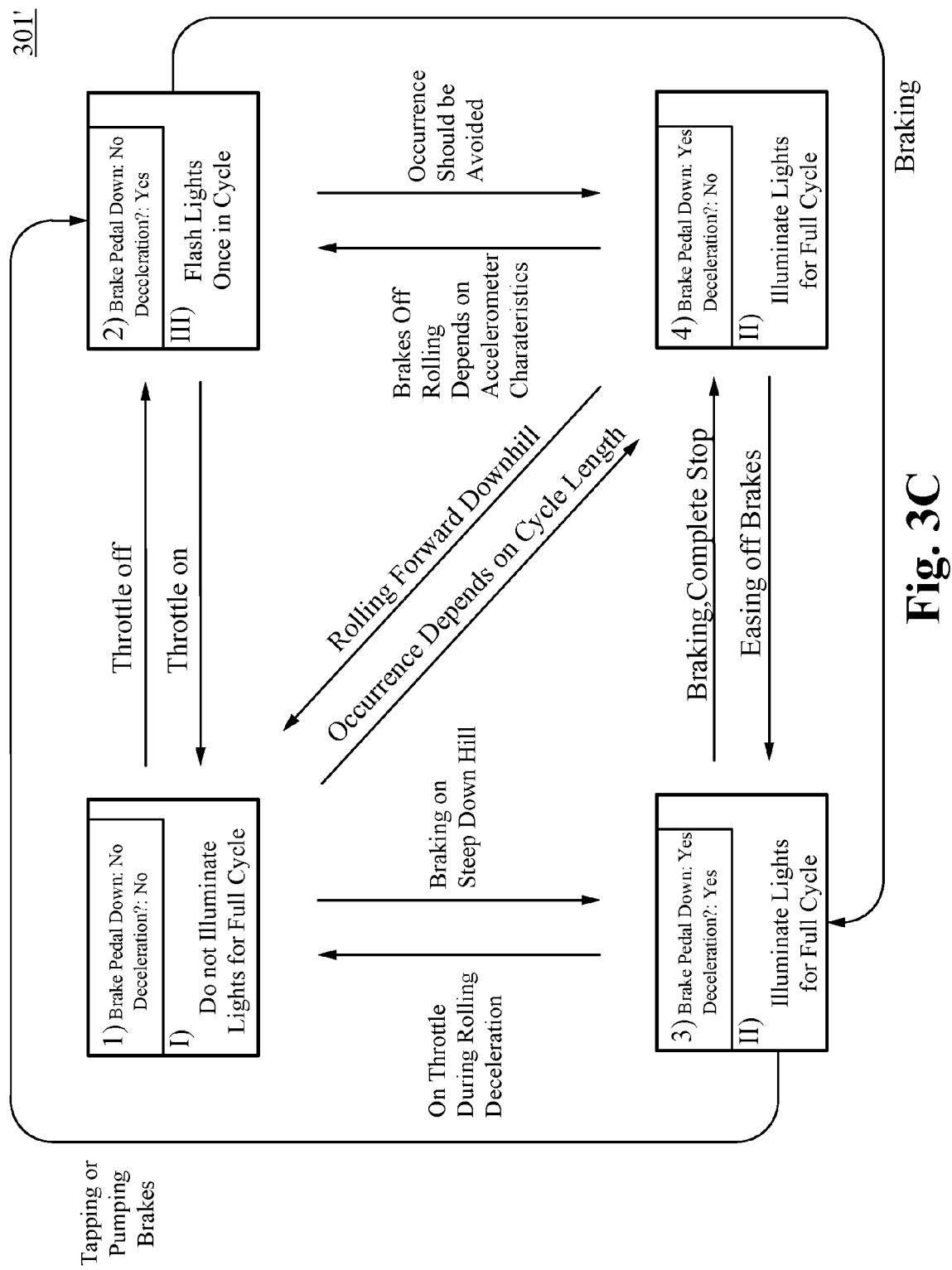
FIG. 3C illustrates a state machine diagram of the control device in accordance with an alternative embodiment of the present invention.

In the alternative embodiment illustrated in FIG. 3C, a state machine 301' included in a control device in accordance with the present invention, the system only considers the first three states. The state machine 301' takes four possible input states: 1) brake pedal is not depressed, deceleration is not detected; 2) brake pedal is not depressed, deceleration is detected; 3) brake pedal is depressed, deceleration is detected; or 4) brake pedal is depressed, deceleration is not detected. Input state 1 corresponds to output state I, input state 2 corresponds to output state III, and input states 3 and 4 correspond to output state II.

Transitions between all input states are handled and every transition is a plausible outcome of a braking or acceleration event. For example, a driver taking his or her foot off the accelerator pedal causes a transition from state 1 to state 2. In the first cycle detecting state 2, the brake lamps are flashed, or other alerting means are activated, corresponding to output state III. This transition from state 1 to state 2 also occurs when beginning ascent of a steep grade: the accelerator is depressed, the brake pedal is disengaged but the vehicle begins to decelerate. If the driver presses the accelerator again, or in the case of an ascent, further depresses the accelerator, a transition from state 2 to state 1 occurs. If the driver subsequently depresses the brake pedal, a transition from state 2 to state 3 occurs. While the brake pedal is depressed, state II output keeps the brake lamps illuminated. Furthermore, while the brake pedal is depressed, a transition from state 3 to state 4 may occur. In this embodiment, such a transition results in no change in output. Whenever the brake pedal is depressed, state II output occurs and accelerometer-gyroscopic sensor data is effectively ignored. When the brake pedal is released, either input state 1 or input state 2 is entered.

In some embodiments a transition from input state 3 to 2 corresponds to tapping or pumping the brake pedal. Depending on the length of time a cycle comprises, a residual brake lamp flash may occur. Transitions from input states 3 or 4 to state 1 correspond respectively to accelerating from a rolling stop on a hill, or rolling forward downhill. A transition from input state 4 to 2 could arise when rolling down a hill backwards, for example at a stoplight on a hill. This points to another feature of the current system—providing a warning for rollback.

In some embodiments, it is less desirable to utilize flashing lamps or a visual signal as the alerting device to indicate a change in the traveling speed of a lead vehicle. For example, in military operations, border patrol, and law enforcement applications it may be desirable to travel in a covert lights-off mode. In such applications, it is desirable to communicate information such as vehicle speed, braking and deceleration from a leading vehicle to a following vehicle in a non-visual manner. Thus, changes in traveling speed may be communicated from the alerting device located in a lead vehicle directly to a receiver located in a following vehicle in a discrete, non-visual manner.

Figure 12:
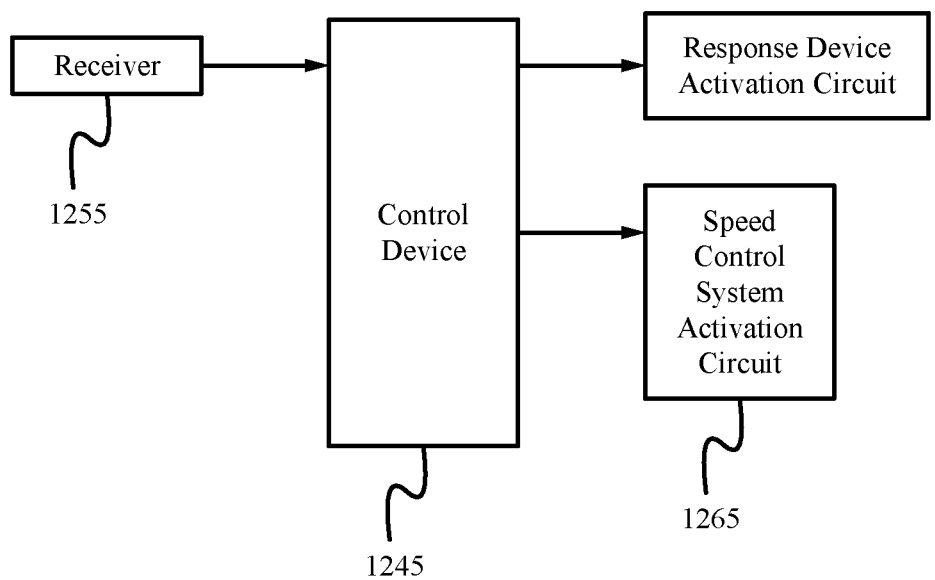
FIG. 12 is a schematic view illustrating the components of the rear-end collision avoidance system, warning drivers of a subject vehicle's traveling speed, in accordance with some embodiments.

FIG. 12 is a schematic view illustrating the components of a rear-end collision avoidance system 1200, warning drivers of a vehicle's traveling speed, in accordance with some embodiments. As shown in FIG. 12, the rear-end collision avoidance system 1200 comprises a receiver 1255, a control device 1245, and a response activation circuit 1275. As shown in FIG. 12, in some embodiments, the rear-end collision avoidance system 1200 also comprises a speed control system activation circuit 1265. The rear-end collision avoidance system 1200 of FIG. 12 works in conjunction with the rear end collision avoidance system 900 described in reference to FIG. 9. Particularly, the rear-end collision avoidance system 1200 is implemented within a following vehicle and receives a signal sent from the alerting device of a lead vehicle.

As described above, in some embodiments, the alerting device is configured to flash conventional signaling or brake lamps at a rate correlated to a rate of deceleration. Additionally, in some embodiments, the alerting device is a RF transmitter capable of directing RF signals from the rear of the vehicle to the following vehicle. In further embodiments, the alerting device is a transmitter that directs a wireless signal to the following vehicle. In some of these embodiments, the signal corresponds to the traveling speed of the vehicle. In further embodiments, the signal corresponds to a deceleration status of the vehicle. In some embodiments, the wireless signal is one or more of an infrared signal, WiFi signal, and a Bluetooth® signal. However, the alerting device is able to transmit any other wireless signal as known in the art. In further embodiments, the alerting device is a rear facing warning device and transmits infrared signals such as for use in covert operations as described above. In some embodiments, the alerting device transmits infrared laser. In further embodiments, the alerting device transmits a signal which is modulated to carry digital information.

In some embodiments, the signal sent by the alerting device is a discrete signal so that the receiver 1255 is able to differentiate the intended signal from other randomly occurring signals. In these embodiments, the receiver 1255 is configured to receive only a specific signal. For example, in some embodiments, the alerting device modulates an infrared signal at 38 KHz and the receiver 1255 is configured to receive an infrared signal only at 38 KHz. In other embodiments, the alerting device modulates an infrared signal at a lower rate such as 100 Hz. Particularly, the alerting device is able to transmit and the receiver 1255 is able to receive signals at any frequency as known in the art. Additionally, in some embodiments, the signal is an infrared LED. In these embodiments, the signal is only received by an enhanced receiver that is capable of viewing infrared LED.

As shown in FIG. 12, the rear-end collision avoidance system 1200 comprises a control device 1245 coupled to a response device activation circuit 1275. As described above, the alerting device sends a signal to the receiver 1255 according to the traveling speed of the lead vehicle. In some embodiments, the alerting device sends a signal to the receiver 1255 that the lead vehicle is decelerating. After receiving a signal from the alerting device, the receiver 1255 sends a signal to the control device 1245 corresponding to the traveling speed of the lead vehicle and the control device 1245 sends a signal to the response device activation circuit 1275, which activates a response device in a manner dependent on the signal from the control device 1245. For example, in some embodiments, the response device generates an alert announcing, "SLOWING TRAFFIC AHEAD . . . SLOWING TRAFFIC AHEAD, or . . . STOPPED TRAFFIC AHEAD . . . STOPPED TRAFFIC AHEAD. In some embodiments, the response device generates a visual alert which appears on a screen. In some embodiments, the response device generates an auditory alert through a Bluetooth® device or speakers. In some embodiments, the response device generates an alert that indicates the actual speed of the lead vehicle. The alert generated by the response device is dependent on the signal received from the control device 1245 and is communicated from the response device to the driver of the following vehicle.

As also shown in FIG. 12, in some embodiments, the rear-end collision avoidance system 1200 comprises a speed control system activation circuit 1265 coupled to the control device 1245. In these embodiments, after receiving a signal from an alerting device, the receiver 1255 sends a signal to the control device 1245 corresponding to the traveling speed of the lead vehicle and the control device 1245 sends a signal to the speed control system activation circuit 1265, which is able to control the speed of the following vehicle in a manner dependent on the signal from the control device 1245. For example, in some embodiments, the control device 1245 activates the speed control system activation circuit 1265 to activate the braking system in order to slow the following vehicle to a speed equal to the lead vehicle. In some embodiments, the control device 1245 activates the speed control system activation circuit 1265 to activate the braking system in order to maintain a safe distance between the following vehicle and the lead vehicle. In further embodiments, the control device 1245 activates the speed control system activation circuit 1265 to increase the speed of the following vehicle in order to maintain a consistent distance between the following vehicle and the lead vehicle such as while traveling within a convoy.

In some embodiments, the rear-end collision avoidance system 1200 comprises a speed control system activation circuit 1265 and a response device activation circuit 1275 coupled to the control device 1245. In some embodiments, the rear-end collision avoidance system 1200 is installed at the factory. In other embodiments, the rear-end collision avoidance system 1200 is installed as aftermarket equipment. In some embodiments, the rear-end collision avoidance system 1200 is implemented on one or more of an automobile, off road vehicle, and motorcycle. In some embodiments the rear-end collision avoidance system 1200 is implemented on a bicycle. The rear end collision avoidance system 900 and the rear-end collision avoidance system 1200 communicate a deceleration status of a lead vehicle to a following vehicle without relying on the conventional stop lamps of the lead vehicle.

Figure 13:
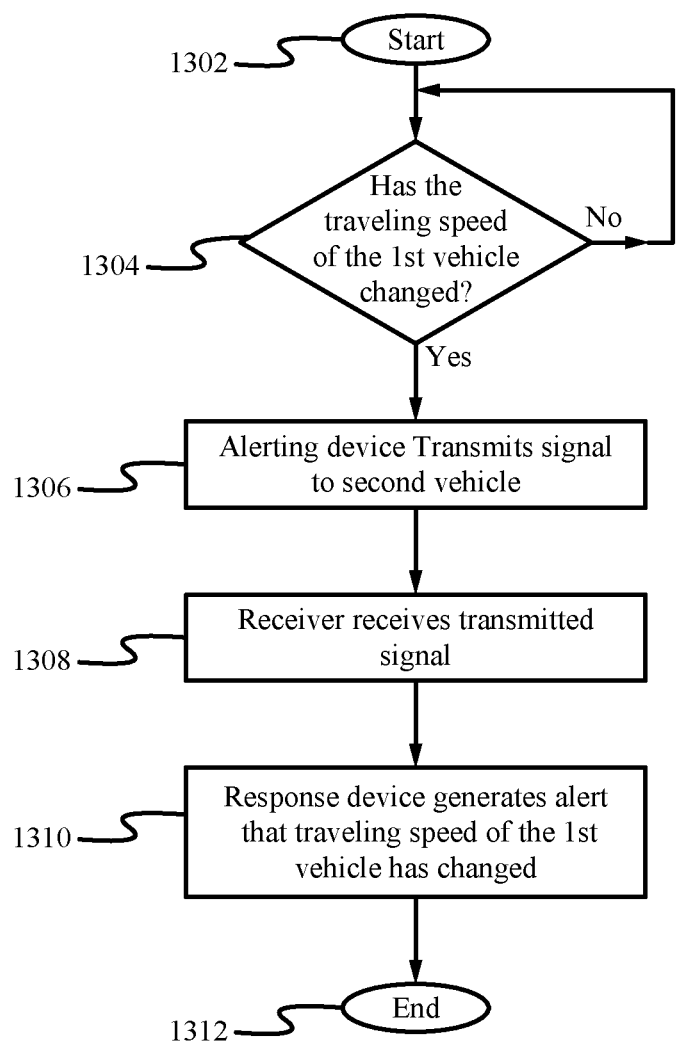
FIG. 13 illustrates a flow chart of a system to communicate a traveling speed of a subject vehicle, in accordance with some embodiments.

FIG. 13 illustrates a flow chart of a system to communicate a deceleration status of a subject vehicle's deceleration, in accordance with some embodiments of the present invention.

As shown in FIG. 13, at the step 1304 a traveling speed of a first vehicle is determined, as described above. If it is determined that the traveling speed of the first vehicle has changed, then at the step 1306, an alerting device of the first vehicle transmits a signal to a second vehicle, such as a following vehicle. As described above, in some embodiments, the signal is one or more of an infrared signal, WiFi signal, and a Bluetooth® signal. At the step 1308, a receiver receives the transmitted signal from the alerting device. Upon receiving the signal from an alerting device, the receiver sends a signal to a control device corresponding to the traveling speed of the first vehicle and the control device sends a signal to a response device activation circuit, which at the step 1310 activates a response device in a manner dependent on the signal from the control device. In some embodiments, the signal and the response correspond to the deceleration status of the vehicle. In some embodiments, the control device also sends a signal to a speed control system activation circuit, which slows or increases the speed of the second vehicle in a manner dependent on the signal from the control device.

In use, the communication system 1200 enables an alerting device placed within a leading vehicle to transmit information to a receiver placed within a following vehicle in a non-visual manner. In doing so the lead vehicle is able to transmit information such as actual speed, braking status, and deceleration discretely and without interference. The communication system has the advantage of allowing users to transmit and receive vehicle speed information in a more direct manner without using conventional brake lamps or other conventional stop lamps. Additionally, the communication system enables a following vehicle to maintain a consistently safe distance from a leading vehicle. Accordingly, the communication system 1200 has many advantages.

In further embodiments, it may be desirable to implement the communication system completely within one vehicle. In these embodiments, information such as vehicle speed, deceleration, braking and distance of a following vehicle may be communicated in a manner dependent on the position of a lead vehicle and the speed of a following vehicle. In calculating a distance between the vehicle and an object such as another vehicle, a communication system is able to activate a warning to indicate an excessive closure rate or an unsafe following distance before receiving a warning from the lead vehicle or as a substitute for receiving a warning from the lead vehicle. Alternatively, the communication system is able to activate a warning to indicate an excessive closure rate or an unsafe following distance of a following vehicle.

Figure 14:
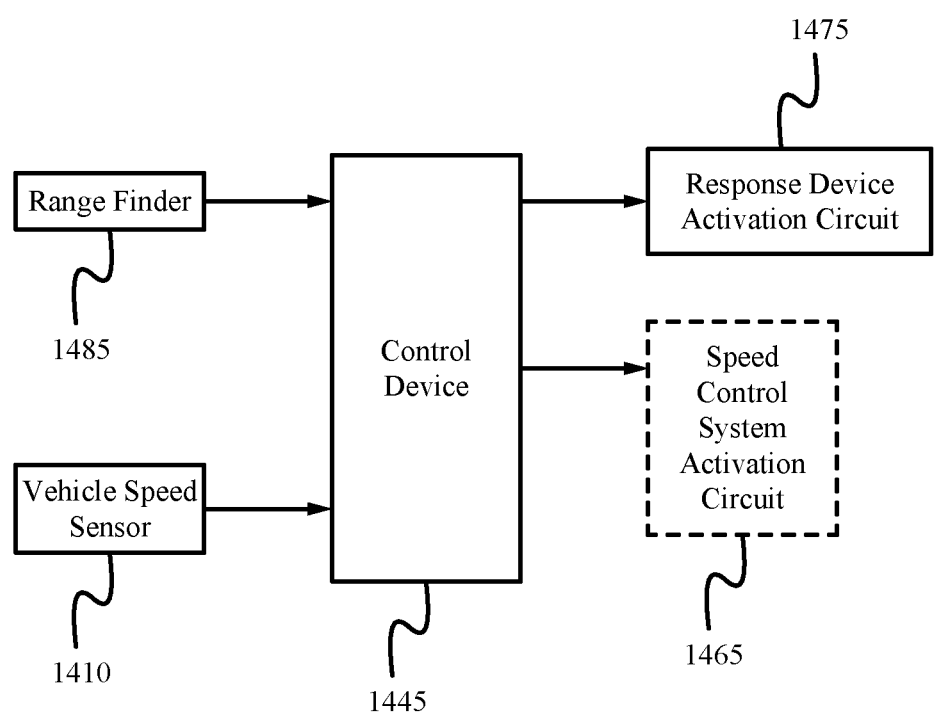
FIG. 14 is a schematic view illustrating the components of the rear-end collision avoidance system, in accordance with some embodiments.

FIG. 14 illustrates a communication system for a vehicle 1400 in accordance with further embodiments. The communication system 1400 comprises a range finder 1485, a vehicle speed sensor (VSS) 1410, a control device 1445, and a response device activation circuit 1475. In some embodiments, the communication system further comprises a speed control system activation circuit 1465. The VSS 1410 emits a period function with a frequency corresponding to the speed of the vehicle and sends a signal to the control device 1445. The range finder 1485 calculates a distance from the vehicle to an object and sends a signal to the control device 1445. Based upon the signal from the VSS 1410 and the range finder 1485 the control device 1445 sends a signal to the response device activation circuit 1475, which operates a response device in a manner dependent upon the signal sent from the control device 1445.

In some embodiments, the range finder 1485 calculates the distance from a following vehicle to a leading vehicle. In some embodiments, the range finder 1485 calculates the distance between the following vehicle and the leading vehicle by utilizing a set of known distances and target sizes. For example, in some embodiments the range finder 1485 calculates the distance between a following vehicle and a lead vehicle by using the license plate of the lead vehicle, which is a standard size. In some embodiments, the distance is measured using sonar, laser and radar. In some embodiments, the distance is calculated using trigonometry methods such as with a stadiametric range finder, parallax range finder, and a coincidence range finder. However, the range finder is able to calculate the distance between the following vehicle and the lead vehicle by any method as known in the art. In some embodiments, the range finder 1485 is pointable in the same direction as a lead vehicle that is making a turn. In these embodiments, the range finder 1485 is able to maintain focus on the leading vehicle for a longer period of time as the leading vehicle turns.

In some embodiments, after calculating the distance from a following vehicle to a leading vehicle, the range finder 1485 sends a signal to the control device 1445 that corresponds to that distance. As described above, the VSS 1410 also sends a signal to the control device 1445 corresponding to the speed of the vehicle. After receiving the signal from the range finder 1485 and the VSS 1410, the control device 1445 sends a signal to the response device activation circuit 1475. The signal sent by the control device 1445 to the response device activation circuit 1475 is dependent upon the signal from the range finder 1485 and the VSS 1410.

In some embodiments, the signal sent by the control device 1445 to the response device activation circuit 1475 is dependent upon whether the following vehicle is following the leading vehicle at a safe distance. In these embodiments, the safe following distance is directly proportional to the rate of speed of the vehicle. For example, if it takes a vehicle approximately 217 feet to stop when traveling 55 miles per hour (mph) and 315 feet to stop when traveling 70 mph then the safe distance could be at least 217 feet at 55 mph and at least 315 feet at 70 mph. Thus, if the control device 1445 receives a signal corresponding to a speed of 55 mph from the VSS 1410 and signal corresponding to a distance of less than 217 feet from the range finder, then the control device 1445 sends a signal to the response device activation circuit which activates the response device. For example, in some embodiments, the response device generates an alert announcing, "YOU HAVE ENCROACHED ON THE SAFE SEPARATION ZONE."

In further embodiments, the response device generates an alert indicating an excessive closure rate of the following vehicle with respect to the leading vehicle. In some embodiments, the response device generates an alert indicating that the following vehicle is traveling too close to the lead vehicle based on its current speed. Alternatively, the response device generates an alert indicating that the following vehicle is traveling too far from the lead vehicle based on its current speed. In further embodiments, the response device generates an alert announcing, "SLOWING TRAFFIC AHEAD . . . SLOWING TRAFFIC AHEAD, or . . . STOPPED TRAFFIC AHEAD . . . STOPPED TRAFFIC AHEAD." As described above, in some embodiments, the response device generates a visual alert which appears on a screen. In some embodiments, the response device generates an auditory alert through a Bluetooth® device or speakers. In further embodiments, the response device generates an alert that indicates the distance between the following vehicle and a leading vehicle.

In still further embodiments, the range finder 1485 calculates the distance from a lead vehicle to a following vehicle. In some embodiments, the range finder 1485 calculates the distance between the leading vehicle and the following vehicle by utilizing a set of known distances and target sizes. For example, in some embodiments the range finder 1485 calculates the distance between a leading vehicle and a following vehicle by using the front license plate of the following vehicle, which is a standard size. In some embodiments, the distance is measured using sonar, laser and radar. In some embodiments, the distance is calculated using trigonometry methods such as with a stadiametric range finder, parallax range finder, and a coincidence range finder. However, the range finder is able to calculate the distance between the following vehicle and the lead vehicle by any method as known in the art. In some embodiments, the range finder 1485 is pointable in the same direction as a following vehicle as the lead vehicle is making a turn. In these embodiments, the range finder 1485 is able to maintain focus on the following vehicle for a longer period of time as the leading vehicle turns.

In some embodiments, after calculating the distance from a leading vehicle to a following vehicle, the range finder 1485 sends a signal to the control device 1445 that corresponds to that distance. As described above, the VSS 1410 also sends a signal to the control device 1445 corresponding to the speed of the vehicle. After receiving the signal from the range finder 1485 and the VSS 1410, the control device 1445 sends a signal to the response device activation circuit 1475. The signal sent by the control device 1445 to the response device activation circuit 1475 is dependent upon the signal from the range finder 1485 and the VSS 1410.

In some embodiments, the signal sent by the control device 1445 to the response device activation circuit 1475 is dependent upon whether the following vehicle is following the leading vehicle at a safe distance. As described above, in these embodiments, the safe following distance is directly proportional to the rate of speed of the vehicle. In some embodiments, the response device generates an alert announcing, "A FOLLOWING VEHICLE HAS ENCROACHED ON THE SAFE SEPARATION ZONE."

In further embodiments, the response device generates an alert indicating an excessive closure rate of the following vehicle with respect to the leading vehicle. In some embodiments, the response device generates an alert indicating that the following vehicle is traveling too close to the lead vehicle based on its current speed. In some embodiments, the response device generates a visual alert which appears on a screen. In some embodiments, the response device generates an auditory alert through a Bluetooth® device or speakers. In further embodiments, the response device generates an alert that indicates the distance between the following vehicle and a leading vehicle. In some embodiments, the communication system further comprises an alerting device, as described above. In these embodiments, the alerting device generates an alert based on a position of the following vehicle, as also described above. In some embodiments, the alerting device generates a visual alert. In some embodiments, the alerting device transmits a signal to a receiver placed within the following vehicle.

As also shown in FIG. 14, in some embodiments, the communication system 1400 comprises a speed control system activation circuit 1465 coupled to the control device 1445. In these embodiments, after receiving a signal from the VSS 1410 and the range finder 1485, the control device 1445 sends a signal to the speed control system activation circuit 1465, which is able to control the speed of the vehicle in a manner dependent on the signal from the control device 1245. For example, in some embodiments, the control device 1445 activates the speed control system activation circuit 1465 to activate the braking system in order to slow the vehicle in order to increase the space between the vehicle and a lead vehicle. In some embodiments, the control device 1445 activates the speed control system activation circuit 1465 to activate the braking system in order to maintain a safe distance between the following vehicle and the lead vehicle. In further embodiments, the control device 1445 activates the speed control system activation circuit 1465 to increase the speed of the following vehicle in order to maintain a consistent distance between the following vehicle and the lead vehicle such as while traveling within a convoy. In still further embodiments, the control device 1445 activates the speed control system activation circuit 1465 to increase the speed of the leading vehicle based on an excessive closure rate of a following vehicle.

In some embodiments, the communication system 1400 comprises a speed control system activation circuit 1465 and a response device activation circuit 1475 coupled to the control device 1445. In some embodiments, the communication system 1400 is installed at the factory. In other embodiments, the communication system 1400 is installed as aftermarket equipment. In some embodiments, the communication system 1400 is implemented on one or more of an automobile, off road vehicle, and motorcycle. In some embodiments the communication system 1400 is implemented on a bicycle.

In use, the communication system 1400 provides a warning which supplements conventional warning systems and indicates possible unsafe driving conditions or slowing traffic. By warning of an excessive closure rate and an unsafe following distance, the speed of a vehicle may be increased or decreased in order to make driving conditions safe. In addition, in some embodiments, the communication system 1400 has the advantage of generating a warning which is tailored to the specific speed of the vehicle and the ideal stopping distance at that speed. Moreover, in some embodiments, by implementing the system entirely within one vehicle, the vehicle is not dependent upon other warning systems in the event of a malfunction or failure of those systems.

In further embodiments, it is desirable to implement a communication system within a vehicle. In these embodiments information such as the speed and the location of the vehicle may be communicated by flashing a light toward the front or a side of the vehicle. Consequently, the vehicle is more easily seen as it approaches another vehicle or as the vehicle enters and travels through an intersection.

Figure 15:
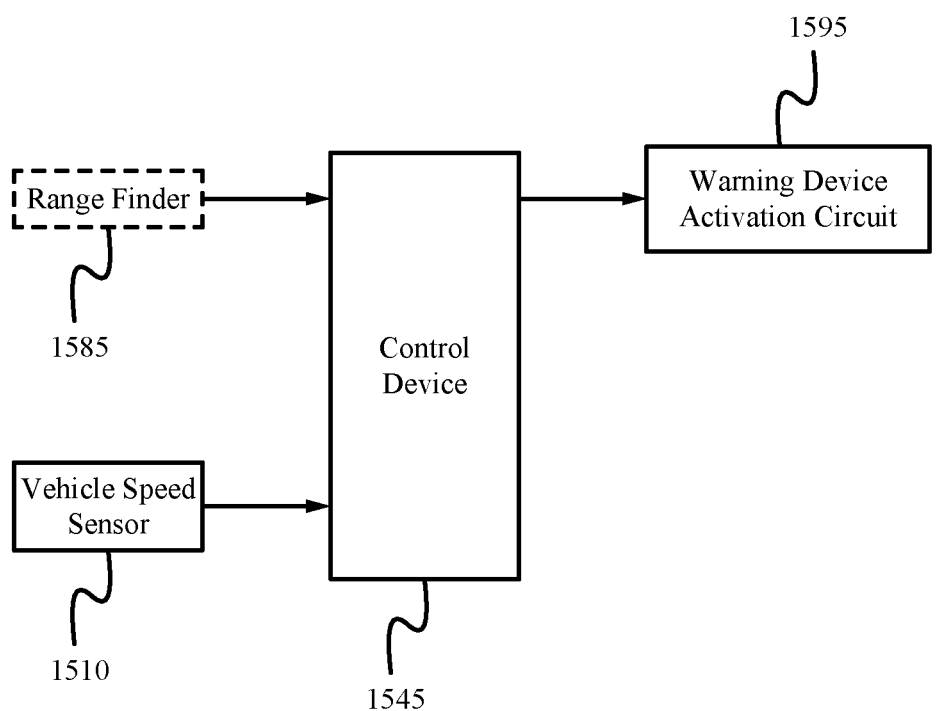
FIG. 15 is a schematic view illustrating the components of a communication system for a vehicle, in accordance with some embodiments.

FIG. 15 is a schematic view illustrating the components of a communication system 1500 for a vehicle in accordance with some embodiments. As shown in FIG. 15, the communication system 1500 comprises a vehicle speed sensor (VSS) 1510, a control device 1545, and a warning device activation circuit 1595. The VSS emits a periodic function with a frequency corresponding to a speed of the vehicle and sends a signal to the control device 1545. The control device 1545 processes the signal it receives from the VSS 1510 and determines whether to activate a warning device. The control device 1545 is coupled to and sends a signal to the warning device activation circuit 1595, which activates the warning device in a manner based on a signal from the control device 1545.

In some embodiments the control device 1545 sends a signal to the warning device activation circuit 1595 to activate a warning device after the vehicle reaches a predetermined rate of speed. For example, in some embodiments the control device 1545 sends a signal to the warning device activation circuit 1595 when the vehicle reaches a speed of 35 miles per hour. In some embodiments, the warning device comprises a lamp which emits a white light. In some embodiments the lamp faces towards a front of the vehicle. In some embodiments the lamp faces toward a side of the vehicle. In further embodiments the communication system 1500 comprises a plurality of lamps which face to the front and a side of the vehicle. However, as will be apparent to someone of ordinary skill in the art, the lamps are able to face in any direction as known in the art. In some embodiments the lamp flashes at a constant rate, while in another aspect the lamp flashes at a variable rate. Additionally, in some embodiments the lamp flashes at a rate correlated to a rate of speed of the vehicle. For example, in some embodiments the warning device flashes the light at an increasingly rapid rate as the vehicle speeds up. In some embodiments the vehicle is a motorcycle.

As further shown in FIG. 15, in some embodiments the communication system 1500 further comprises a rangefinder 1585. In these embodiments, the rangefinder 1585 calculates a distance from the vehicle to an object and sends a signal to the control device 1545. The rangefinder 1585 is able to calculate the distance from the vehicle to an object in a manner as described above. Based upon the signal from the VSS 1510 and the rangefinder 1585 the control device 1545 sends a signal to the warning device activation circuit 1595, which operates the warning device in a manner dependent on the signal from the control device 1545.

In some embodiments the rangefinder 1585 calculates the distance from the vehicle to a leading vehicle. Thus, as described above the control device 1545 is able to send a signal to the warning activation circuit 1595 which activates the warning device based upon the speed of the vehicle and the distance of the vehicle from the leading vehicle. In further embodiments the rangefinder 1585 is pointable in an upward or a diagonally upward direction. In these embodiments the rangefinder 1585 is able to calculate the distance between a vehicle and an object such as an overhead stoplight or a stop sign. Consequently, in some embodiments the control device 1545 is able to send a signal to the warning activation circuit 1595 which activates the warning device when the vehicle is a certain distance from an intersection. For example, the warning device is able to flash when the vehicle is a certain distance from an intersection so that the vehicle is more easily seen as the vehicle travels through the intersection. In further embodiments the rangefinder 1585 is pointable in a direction to a side of the vehicle. Thus, in some embodiments the control device 1545 is able to send a signal to the warning activation circuit 1595 which activates the warning device as the vehicle enters an area of congestion or an area where the vehicle is likely to encounter turning automobiles.

In use, the communication system 1500 provides a warning system which supplements a conventional warning system of a vehicle. By communicating a position of the vehicle to the front and/or a side of the vehicle, the communication system 1500 is able to communicate the vehicle's position to other vehicles who may not directly see the vehicle. In this manner, the vehicle is able to communicate a warning to side traffic as it approaches an intersection. Additionally, the vehicle is able to communicate its position as it approaches another vehicle from the rear. Accordingly, by flashing a white light to the front and/or a side of the vehicle, the communication system 1500 increases the visibility of the vehicle increasing the probability that the vehicle will be seen by other turning and merging vehicles during travel. In some embodiments, the communication system 1500 actuates the vehicle's head lamp high and low beams in an alternating fashion.

Embodiments of the present invention provide the driver of a subject vehicle a communication system that provides warning signals to other vehicles of any deceleration or possibility of braking of the subject vehicle. One novel and distinguishing feature of this invention is that the subject vehicle's communication system warns other vehicles of any possibility that the subject vehicle will begin to brake. This is so because any engagement of the brake pedal is usually immediately preceded by a disengagement of the throttle.

Thus, this invention provides an earlier warning to the driver of the following vehicle of a subject vehicle's intent to decelerate than is currently available in modern vehicles, which only provide systems that actuate warning lamps if the driver depresses the brake pedal or if an accelerometer unit detects a threshold deceleration. Modern drivers respond quickly to rear brake warning lamps, conditioning that the present invention takes advantage of by using these warning systems to convey new and broader warnings. Since following distances on modern roadways are often inadequate, this arrangement could prevent numerous rear-end collisions.

In some embodiments, if the vehicle is traveling an unsafe distance from a leading vehicle, then the event is recorded. In these embodiments, a communication system for a vehicle comprises a pointable range finder to calculate a distance between the vehicle and a leading vehicle, a recorder for recording an operation status of the vehicle and a control device. The range finder sends a signal to the control device corresponding to the vehicle's distance from the leading vehicle and the control device operates the recorder in a manner dependent upon the signal from the range finder. In some embodiments, if the range finder sends a signal to the control device that the vehicle is an unsafe distance from the leading vehicle, then the control device sends a signal to the recorder to record the event. The unsafe distance is able to be a programmed distance. In some embodiments, the unsafe distance increases with an increase in speed of the vehicle.

Figure 16:
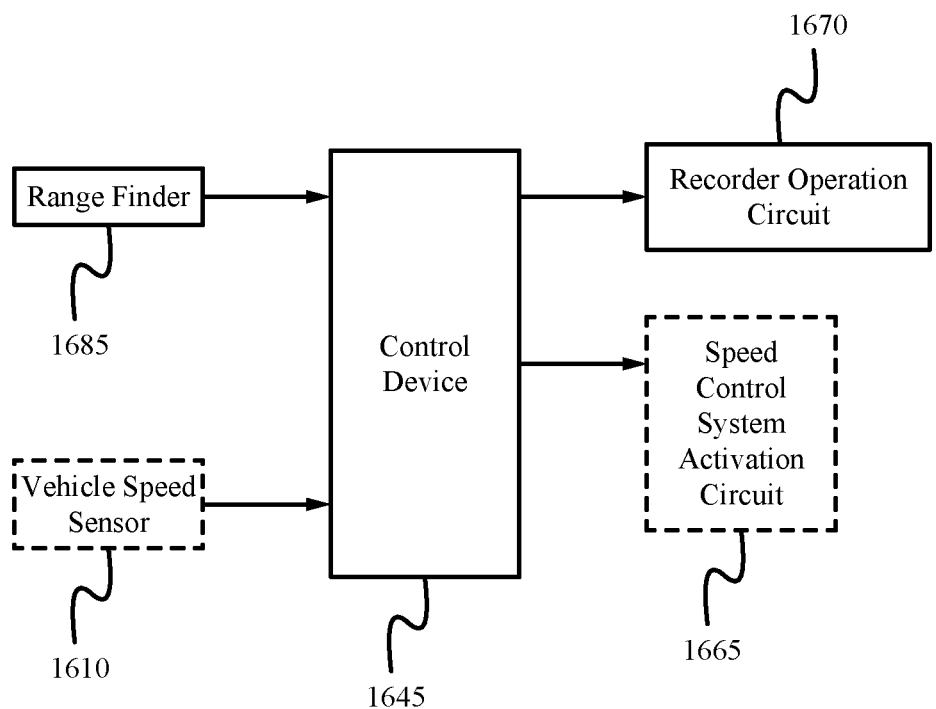
FIG. 16 is a schematic view illustrating the components of a communication system for a vehicle, in accordance with some embodiments.

Referring now to FIG. 16, a communication system for a vehicle is shown therein. The communication system 1600 comprises a pointable range finder 1685, a recorder operation circuit 1670 and a control device 1645. The range finder 1685 functions similarly to the range finder 1485, such as described above. The range finder 1685 calculates the distance between a vehicle and an object such as a leading vehicle. In some embodiments, the range finder 1685 calculates the distance between a vehicle and an object by utilizing a set of known distances and target sizes. For example, in some embodiments the range finder 1685 calculates the distance between the vehicle and a leading vehicle by using the license plate of the leading vehicle, which is a standard size. In some embodiments, the distance is measured using sonar, laser and radar. In some embodiments, the distance is calculated using trigonometry methods such as with a stadiametric range finder, parallax range finder, and a coincidence range finder. However, the range finder is able to calculate the distance between the following vehicle and the lead vehicle by any method as known in the art. In some embodiments, the range finder 1685 is pointable in the same direction as a lead vehicle that is making a turn. In these embodiments, the range finder 1685 is able to maintain focus on the leading vehicle for a longer period of time as the leading vehicle turns. In some embodiments, the range finder 1685 comprises an accelerometer to determine the direction and degree of turn.

After calculating the distance from the vehicle to an object, the range finder 1685 sends a signal to the control device 1645 that corresponds to that distance. The control device 1645 sends a signal to the recorder operation circuit 1670 to operate the recorder based upon the signal from the range finder. For example, in some embodiments, the control device 1645 receives a signal from the range finder 1645 that the vehicle is an unsafe distance from an object, consequently, the control device 1645 sends a signal to the recorder operation circuit 1670 to operate the recorder and record the event. In some embodiments, the unsafe distance is a programmed value. For example, in some embodiments, the control device 1645 sends a signal to the recorder operation circuit 1670 to record every instance in which the vehicle comes within twenty feet or two car lengths of an object, such as a leading vehicle. Alternatively, in some embodiments, the unsafe distance increases as the speed of the vehicle increases. For example, as described above, if it takes a vehicle approximately 217 feet to stop when traveling 55 miles per hour (mph) and 315 feet to stop when traveling 70 mph then the safe distance could be at least 217 feet at 55 mph and at least 315 feet at 70 mph. In some embodiments, the unsafe distance increases at a constant rate such as one car length per every ten mph after the vehicle reaches a certain speed.

The safe distance or safe zone is able to be determined by a programmable constant. For example, in some embodiments the constant is programmed to increase the safe zone 18 feet per increase of 10 mph of speed of the car. Thus, the safe zone would comprise X at a speed of Y and X+18 at a speed of Y+10. In some embodiments, the constant is variable depending upon the speed of the car and increases the safe zone as the speed of the car increases. Alternatively, in some embodiments, the constant is programmed to increase the safe zone at a constant rate once the vehicle reaches a determined speed such as 50 mph. Particularly, by using a constant value or variable in order to calculate the safe zone, the safe zone is determined according to the speed of the vehicle, the vehicle's distance from an object and a pre-defined safe zone threshold or constant value.

Referring to FIG. 16, the control device 1645 receives a signal from the VSS 1610 corresponding to a speed of the vehicle and a signal from the range finder 1685 corresponding to the vehicle's distance from the object. After receiving the signal from the VSS 1610 and the range finder 1645, the control device 1645 compares the values to the programmed constant and sends a signal to the recorder operation circuit 1670 and/or the speed control activation circuit 1665. In some embodiments, if the vehicle is an unsafe distance from the object, a signal to the recorder operation circuit 1670 to record the instance. Alternatively or in combination, in some embodiments, if the vehicle is an unsafe distance from the object, a signal to the recorder operation circuit 1670 to the speed control activation circuit 1665 to slow the vehicle. In further embodiment, the communication system 1600 comprises a response device activation circuit 1475, such as shown in FIG. 14. Consequently, in some embodiments, an alert is generated if the vehicle is an unsafe distance from the object. The response device is able to generate an alert announcing, "A FOLLOWING VEHICLE HAS ENCROACHED ON THE SAFE SEPARATION ZONE," such as described above. In some embodiments, the response device generates an alert in order to indicate an excessive closure rate of the vehicle with respect to the object as determined by the range finder 1685.

In some embodiments, after the event is recorded it is saved. In this manner, the communication system 1600 is able to record and store a plurality of different safe zone encroachment events accumulated by the vehicle over a period of time. The communication system 1600 is able to comprise any appropriate memory device in order to save and store the one or more safe zone encroachment events. In some embodiments, after one of the one or more safe zone encroachment events are saved, the events are retrievable. For example, in some embodiments, the one or more safe zone encroachment events are downloaded to a computer database or computer operating system. Particularly, in some embodiments, the one or more safe zone encroachment events are automatically downloaded as they happen and/or after the vehicle has traveled a specified amount of miles. Alternatively, the one or more safe zone encroachment events are automatically downloaded when the vehicle reaches its destination or when the vehicle returns to its starting point, such as the vehicle's corporate yard.

As shown within FIG. 16, in some embodiments, the communication system 1600 comprises a vehicle speed sensor (VSS) 1610. The VSS 1610 emits a periodic function with a frequency corresponding to the speed of the vehicle and sends a signal to the control device 1645. The range finder 1485 calculates a distance from the vehicle to an object and sends a signal to the control device 1645. Based upon the signal from the VSS 1610 and the range finder 1685 the control device 1645 sends a signal to the recorder operation activation circuit 1670, which operates the recorder in a manner dependent upon the signal sent from the control device 1645, such as described above. Additionally, in these embodiments, the communication system 1600 is able record additional conditions surrounding the safe zone encroachment event, such as the traveling and closing speed of the vehicle.

In further embodiments, the communication system 1600 comprises a speed control system activation circuit 1665 coupled to the control device 1645. In these embodiments, after receiving a signal from the VSS 1610 and the range finder 1685, the control device 1645 sends a signal to the speed control system activation circuit 1665, which is able to control the speed of the vehicle in a manner dependent on the signal from the control device 1645, such as described above.

Figure 17:
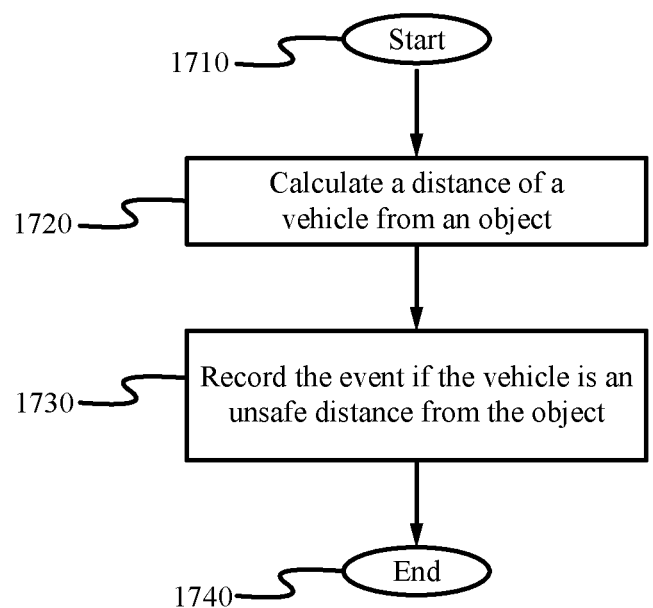
FIG. 17 illustrates a flow chart for a communication method for a vehicle, in accordance with some embodiments.

FIG. 17 illustrates a communication method for a vehicle in accordance with some embodiments. The communication method begins in the step 1710. In the step 1720, a distance is calculated between the vehicle and an object, such as a leading vehicle. In some embodiments, the distance is calculated by a pointable range finder, such as described above. If it is determined that the vehicle is an unsafe distance from the object, then the event is recorded in the step 1730. In some embodiments, the unsafe distance is a programmed value. Alternatively, in some embodiments, the unsafe distance increases as the speed of the vehicle increases. In some embodiments, the safe zone encroachment event is saved. In some embodiments, a plurality of safe zone encroachment events are saved. The one or more safe zone encroachment events are able to be manually and/or automatically retrieved. For example, the one or more safe zone encroachment events are automatically downloaded as they happen and/or after the vehicle has traveled a specified amount of miles. Alternatively, the one or more safe zone encroachment events are automatically downloaded when the vehicle reaches its destination or when the vehicle returns to its starting point, such as the vehicle's corporate yard.

Figure 18:
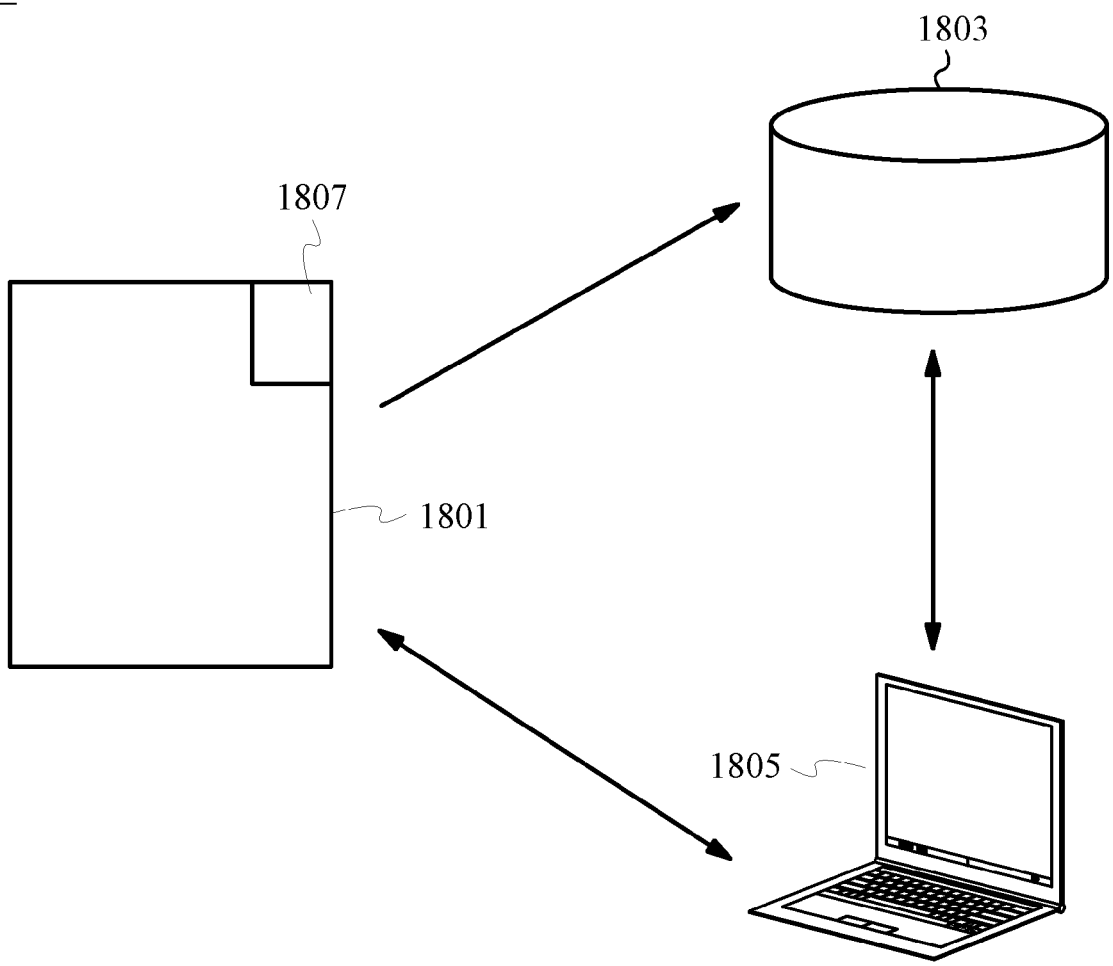
FIG. 18 illustrates a communication system for a vehicle, in accordance with some embodiments.

FIG. 18 is a schematic view of a communication system for a vehicle. The communication system 1800 comprises a system 1801 located within a vehicle which is configured to calculate and record a following distance and/or other operation status of the vehicle. In some embodiments, the system 1801 records an unsafe distance encroachment event of the vehicle. For example, in some embodiments, the system 1801 is configured to record when the vehicle is traveling too close to a leading vehicle. As described above, in some embodiments, the unsafe distance is a programmed value. Alternatively, in some embodiments, the unsafe distance increases as the speed of the vehicle increases. In some embodiments, after the system 1801 records the safe zone encroachment event it is stored in a memory device 1807 of the system 1801. The memory device 1807 is able to comprise any appropriate conventional memory device as known in the art. The system 1801 is able to record and save a plurality of different safe zone encroachment events by the vehicle occurring at different times.

In some embodiments, after one or more safe encroachment events are records, the events are saved within a database 1803. The database 1803 is able to store one or more safe zone encroachment events from a plurality of different vehicles. For example, in some embodiments, the database 1803 stores one or more safe zone encroachment events from each vehicle within a fleet of vehicles. In some embodiments, the one or more safe zone encroachment events are automatically saved within the database 1803, such as when the vehicle reaches its destination or when the vehicle returns to its starting point. Alternatively, in some embodiments, the one or more safe zone encroachment events are manually uploaded to the database 1803.

After the one or more safe zone encroachment events are stored within the database 1803 they are able to be downloaded by a computing device 1805. In some embodiments, the computing device 1805 comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, or other smart phone. Alternatively, in some embodiments, the one or more safe zone encroachment events are downloaded directly from the system 1801. Particularly, the one or more safe zone encroachment events are able downloaded from the system 1801 in a wired or wireless manner. For example, in some embodiments, the safe zone encroachment events are downloaded by a long range RF signal and/or bluetooth signal as the vehicle enters its corporate yard.

In use, the communication system records a safe zone encroachment event of a vehicle. The system is able to calculate the distance between a vehicle and an object, such as a leading vehicle, and determine whether the vehicle is an unsafe distance from the object. By recording the instances in which the vehicle travels too close to the object, the unsafe or safe driving habits of the vehicle are determined. Additionally, each encroachment event is saved and downloaded and/or uploaded for later access. Further, because the system records each encroachment event, the speed and conditions surrounding the event are available for download by the vehicle's owner or the management of a group of fleet vehicles. Moreover, because the one or more safe zone encroachment events are able to be automatically downloaded they are available as they happen and/or after the vehicle has traveled a specified amount of miles. Alternatively, the one or more safe zone encroachment events are automatically downloaded when the vehicle reaches its destination or when the vehicle returns to its starting point, such as the vehicle's corporate yard. Particularly, the communication system is able to be programmed by management or fleet operations of the corporate yard. Additionally, because the range finder is pointable, it is pointable in the direction of a leading vehicle while the vehicle is rounding a curve and it is able to be trained on the object for a longer period of time. Accordingly, the communication system for recording an unsafe encroachment event has many advantages.

Example 2: Anti-Rollover Systems

In some embodiments of this invention, outputs from the sensing of absolute lateral acceleration are used to adjust suspension systems by stiffening outside suspension and/or loosening inside suspension of moving vehicles. Further, in some other embodiments, simple lateral acceleration is used to adjust suspension systems during turning.

When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

The above can be accomplished either with an absolute lateral acceleration signal and a gyroscopic correction, or with an uncorrected lateral acceleration signal. In the latter scenario, an accelerometer mounted to sense lateral acceleration also detects a component of gravitational acceleration during a banked turn. The strength of the gravitational component relative to the lateral (centrifugal) acceleration will depend on the speed of the turn. Correction to the suspension system is performed accordingly. In addition, this type of suspension adjustment system could be used only when the vehicle is turning. A gyroscope mounted in the horizontal plane to sense heading (e.g. FIG. 2A) could be used to sense whether the vehicle is turning or not.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

Figure 4:
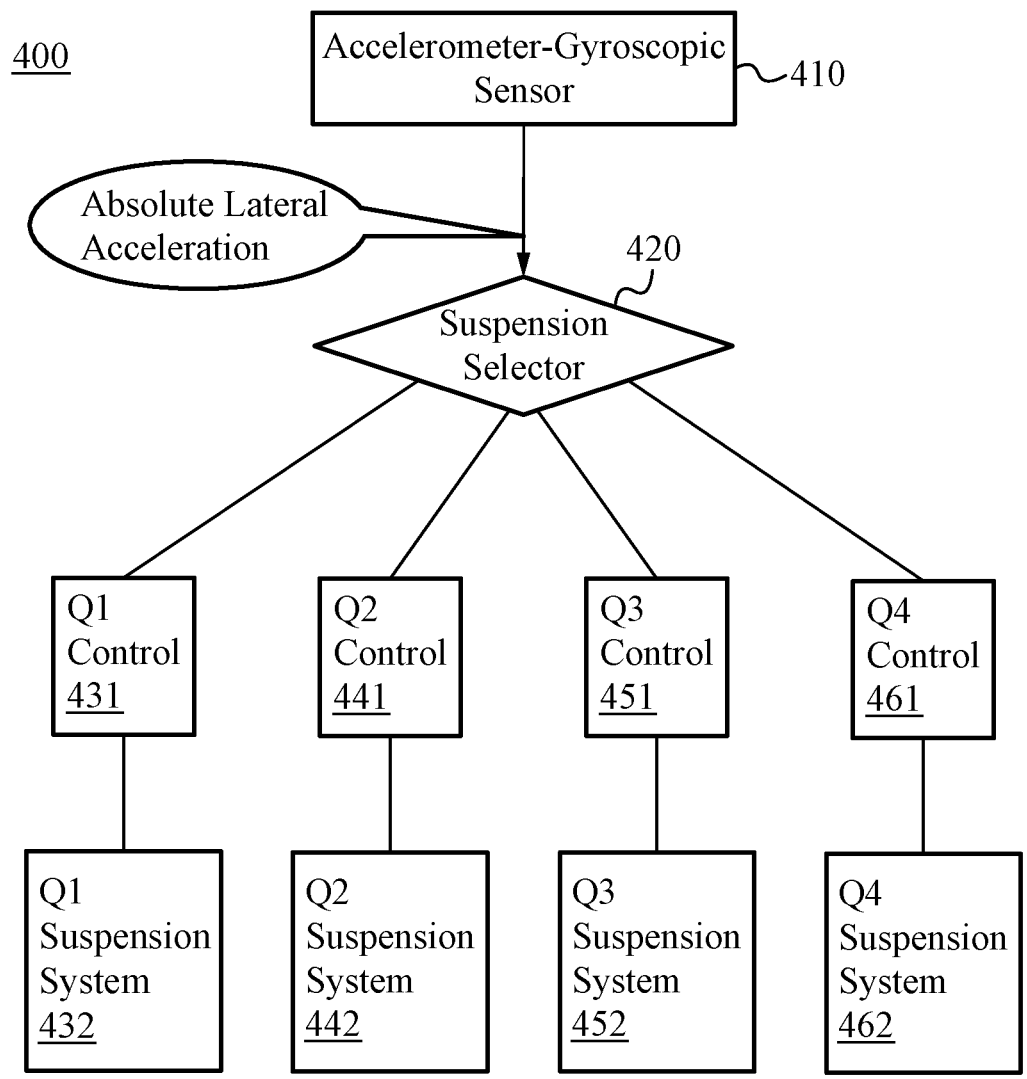
FIG. 4 illustrates a schematic view of an anti-rollover system in accordance with an embodiment of the present invention.

An anti-rollover device 400 using an absolute acceleration signal is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

Figure 8:
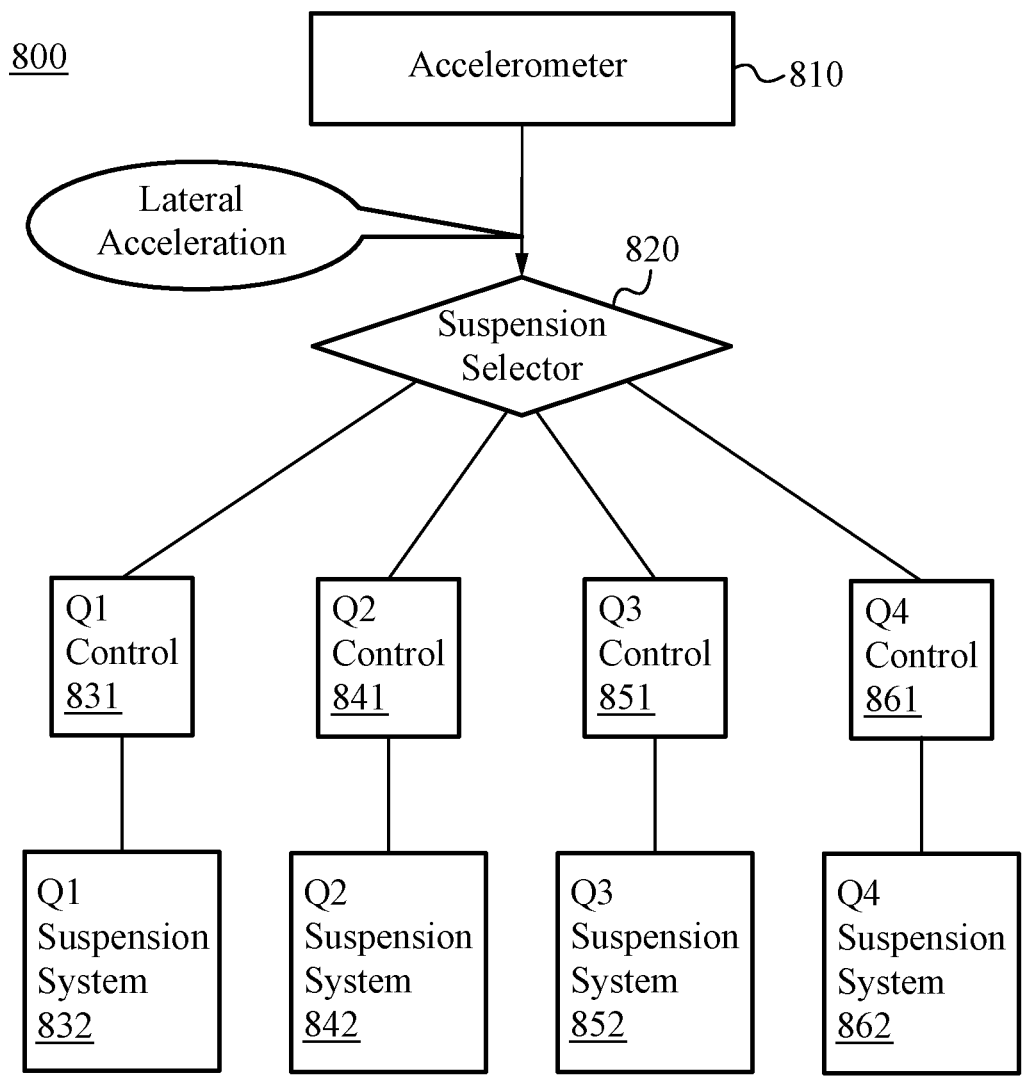
FIG. 8 illustrates a schematic view of an anti-rollover system in accordance with an embodiment of the present invention.

An anti-rollover device 800 using a lateral accelerometer is illustrated in FIG. 8. In this embodiment vehicles are assumed to be equipped with adjustable suspension systems, typically hydraulic or pneumatic. When lateral acceleration is sensed the accelerometer 810 sends a signal representing lateral acceleration to a suspension selector 820, which passes signals along to a controller responsible for controlling the relevant quadrant of the suspension. The suspension selector 820 must interpret the signal to determine the appropriate quadrant. For example, Q1, in which suspension system 832 is controlled by suspension control 831 could be the right front wheel; Q2, in which suspension system 842 is controlled by suspension control 841 could be the left front wheel; Q3, in which suspension system 852 is controlled by suspension control 851 could be the right rear wheel; and Q4, in which suspension system 862 is controlled by suspension control 861 could be the left rear wheel. Of course, other orderings are possible, as are systems with only two independent zones, e.g. two sides are controlled in lockstep.

Example 3: Performance Monitoring Systems

Due to fuel efficiency goals and competitive pressures late model vehicles have the ability to monitor engine system performance through an array of sensors and detectors. The absolute accelerometer/gyroscope combination provides the ability to communicate actual power-to-the-ground data for use in engine/vehicle performance computations. In this embodiment, the accelerometer-gyroscopic sensor continuously sums absolute acceleration values to provide both absolute acceleration and actual speed values, which can be used by a manufacturers vehicle computer unit (VCU).

Figure 5:
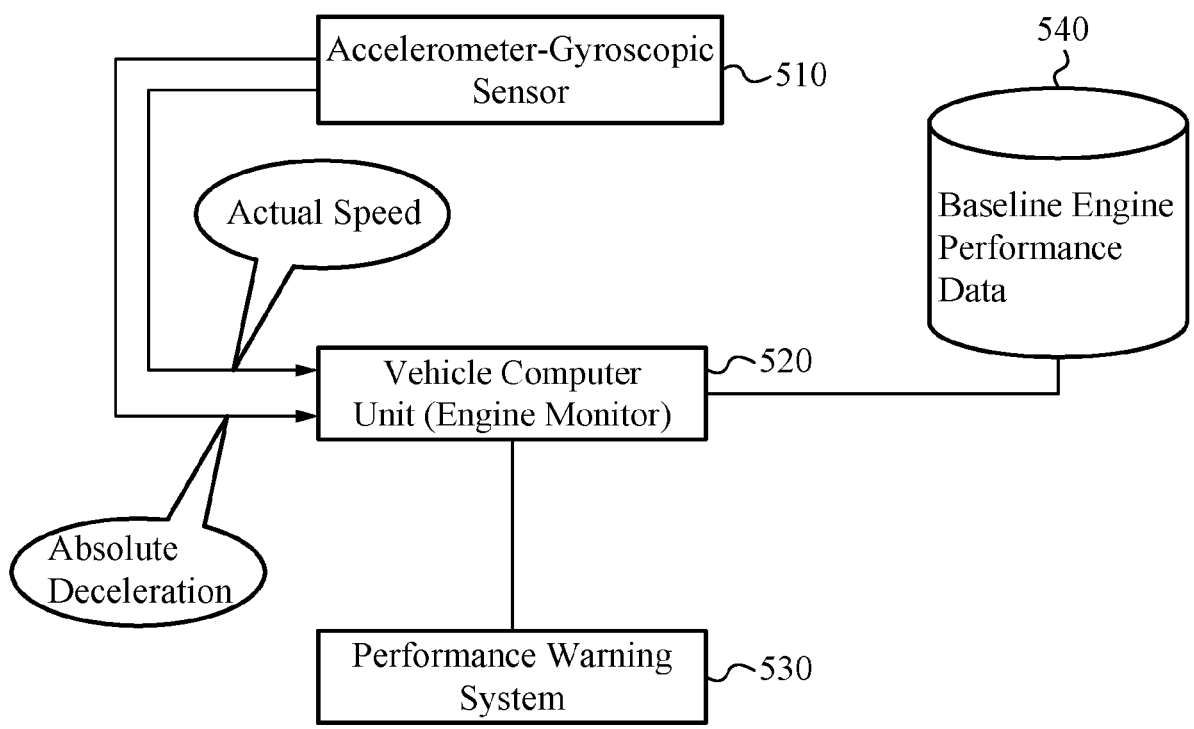
FIG. 5 illustrates a schematic view of an engine performance monitoring system in accordance with an embodiment of the present invention.

For example, the system 500 shown in FIG. 5 includes the accelerometer-gyroscopic sensor 510, which delivers actual speed data and absolute acceleration data to a vehicle computer unit (VCU) 520 (or at least the engine monitoring portion thereof). The VCU 520 uses baseline engine performance data 540 to either self-correct through a feedback mechanism, or to issue a warning through the performance warning system.

The manufacturer's baseline engine performance data is helpful in determining how much acceleration should be achieved for a given amount of throttle and what the speed of the vehicle should be for a given amount of throttle. For instance, a VCU may have tuned to maximum efficiency however the vehicle's corresponding speed or acceleration may be many percentage points less than what would be expected, indicating perhaps that the tire pressure is low or that the vehicle is loaded to a higher level than what would be normal, in which case the tire pressure should be increased.

Example 4: Road or Suspension Condition Monitoring Systems

Because an accelerometer-gyroscopic sensor, which is used and is part of this invention can use one axis of a dual axis accelerometer in the vertical position vertical acceleration output signals are made available to other monitors or computers that require this information. Such a requirement may be to monitor and evaluate road quality and/or shock absorber utilization and performance. For instance, it is apparent to a rider in a vehicle when such vehicle is riding on worn out shock absorbers. However, it becomes less apparent when those shock absorbers wear out slowly over an extended period of time. The first time a driver may realize that shock absorbers have worn out is in cases where critical performance is required. Or when they replace worn out tires and see the evidence on tires of worn out shock absorbers. The absolute A/G sensor detects vertical acceleration in very small increments. Increasing levels of vertical acceleration can easily be monitored thus providing notice to drivers of the degradation of shock absorber system.

Figure 6:
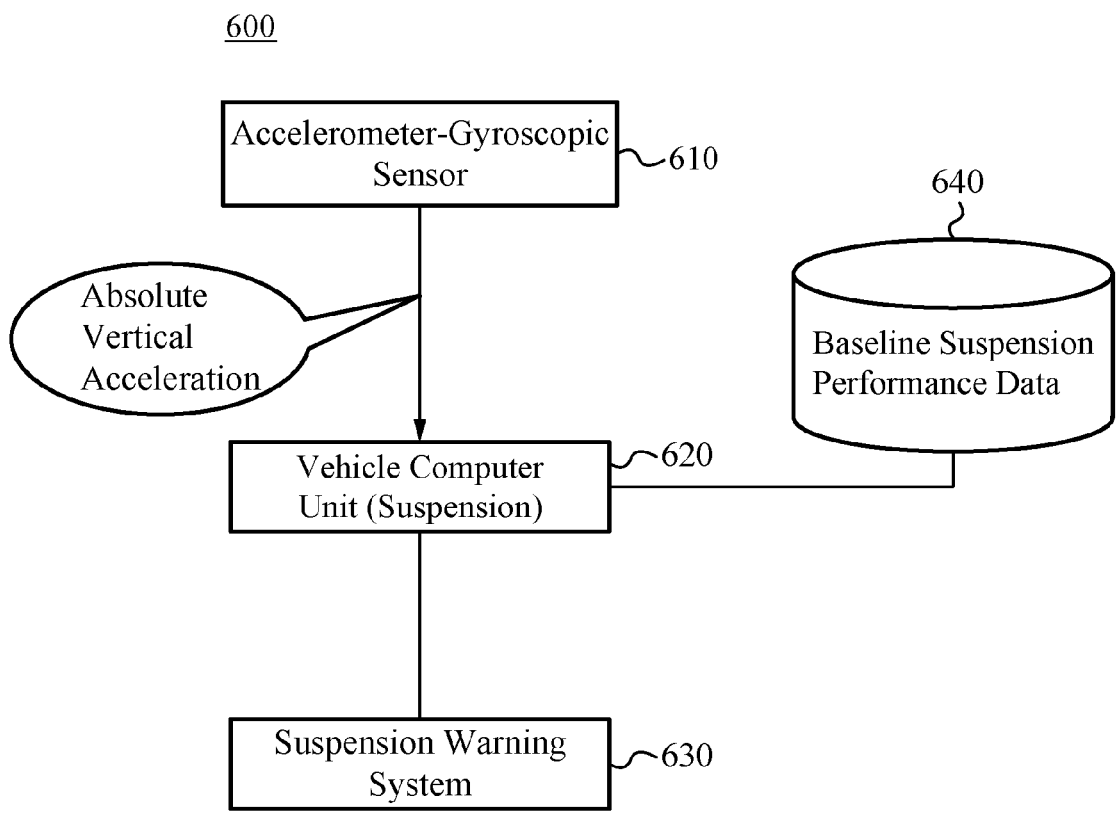
FIG. 6 illustrates a schematic view of a suspension and road condition monitoring system in accordance with an embodiment of the present invention.

For example, in the system 600 shown in FIG. 6, the accelerometer-gyroscopic sensor 610 provides absolute vertical acceleration data to a VCU 620 or at least a suspension-monitoring portion thereof. The VCU 620 can use baseline suspension performance data 640 to either self-correct through a feedback mechanism or issue a warning through the suspension warning system 630.

Example 5: Navigation Systems

In most embodiments, the accelerometer-gyroscopic sensor is continuously monitoring acceleration; a unit of acceleration multiplied by a unit of time yields a unit of velocity (with speed as its magnitude). In some embodiments, the accelerometer-gyroscopic sensor continuously sums units of acceleration over small increments of time. In this case, the accelerometer-gyroscopic sensor provides the integrated velocity or speed as an output. In some embodiments, when a horizontally mounted gyroscope is incorporated, the accelerometer-gyroscopic sensor also provides direction or heading as an output.

Figure 7:
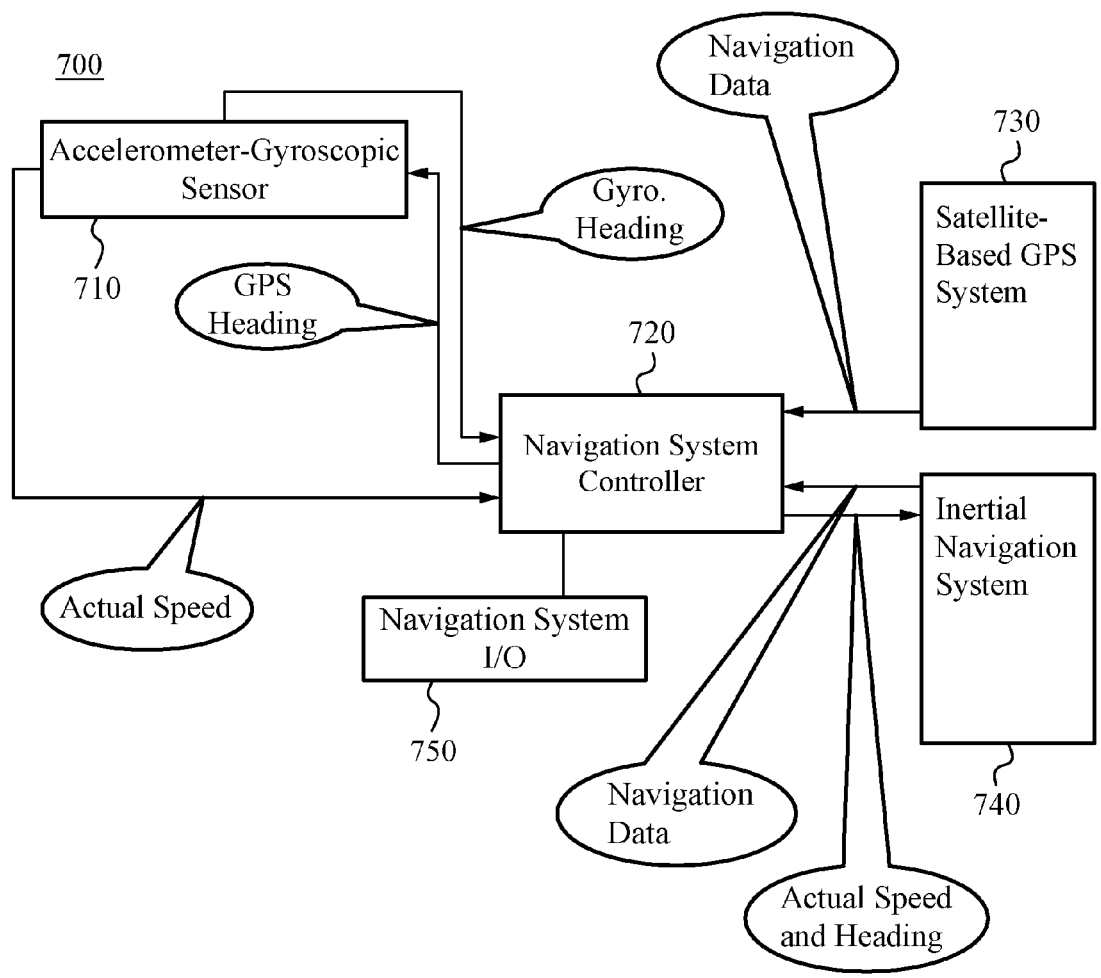
FIG. 7 illustrates a navigation system in accordance with an embodiment of the present invention.

Because velocity, or speed and heading are the raw elements required for inertial navigation systems. In the system 700 shown in FIG. 7, the accelerometer-gyroscopic sensor 710 provides actual speed and heading information as an output to a navigation system controller 720. The navigation system controller 720, which normally provides navigation data from a global positioning system (GPS) 730 directly to the navigation system input/output (I/O) 750, incorporates heading information from the accelerometer-gyroscopic sensor 710 during periods of connection loss with the GPS satellite system. In return for providing the heading data to the inertial navigation system 740, the navigation controller receives navigation data from the inertial system to supplement or replace its GPS data.

In some embodiments, the navigation system controller 720 also provides GPS heading data back to the accelerometer-gyroscopic sensor 710 to permit re-referencing of the gyroscopes contained therein. Continuous referencing and re-referencing of the horizontally mounted gyroscope utilize GPS heading values while satellite signals are acquired. Once satellite signals are lost gyroscopic heading values take priority using last known valid headings from the GPS. This method using absolute A/G values for supplementing data to the GPS data when the GPS system has lost signal will find use in many applications outside of the automotive industry.

These elements in output signal format are made available to on board GPS based navigation systems through a data port for supplementation during periods of lost or down satellite signals so that the user of a GPS navigation system sees no down time during these periods.

In another aspect, since speed or velocity can be tracked by summing positive and negative accelerations and multiplying by time, a second multiplication by time can yield distance, which is also useful in navigation.

Example 6: Altimeter Systems

In another aspect, summing positive and negative vertical accelerations over time yields altitude. For example, an instrument, including an accelerometer-gyroscopic sensor, placed in an airplane or other flying object, contains a circuit that continuously sums over all accelerations and outputs altitude. Alternatively, a system including an accelerometer-gyroscopic sensor included in a non-flying vehicle tracks changes in altitude and outputs a signal used to vary engine performance or some other type of parameter.

This method of altitude determination has certain advantages over current methods of determining altitude which rely on either radar, pressure sensors, or GPS triangulation. Of course its accuracy in determining altitude above sea level (ASL) relies on knowledge of initial altitude, and its accuracy in determining altitude above ground level (AGL) relies on terrain maps or something similar. Since this type of instrument would reveal nothing about a changing ground level below an aircraft, any aircraft equipped with it would still require a radar altimeter for determining AGL on instrument approaches that require such.

Example 7: Dynamic Suspension Adjustment Systems

In some embodiments of this invention, outputs from the sensing of lateral acceleration are used to adjust suspension systems by stiffening outside suspension and/or loosening inside suspension of moving vehicles.

When lateral acceleration or force is applied to a vehicle, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity of vehicles within a tighter envelope relative to the wheelbase. This inversely affects the propensity, especially in high center of gravity loaded vehicles, to rollover when the center of gravity of their load exceeds the wheelbase and reaches the critical rollover point. Additionally, by adjusting the suspension system in this manner the distribution of load between left and right side wheels is kept more even resulting in improved traction.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid.

The hydraulic solenoids of course are responsible for increasing, decreasing or maintaining pressure levels within the hydraulic or pneumatic suspension system.

An anti-rollover device 400 is illustrated in FIG. 4. In this embodiment vehicles are assumed to be equipped with adjustable suspension systems, typically hydraulic or pneumatic. When absolute lateral acceleration is sensed the accelerometer-gyroscopic sensor 410 sends a signal representing absolute lateral acceleration to a suspension selector 420, which passes signals along to a controller responsible for controlling the relevant quadrant of the suspension. The suspension selector 420 must interpret the signal to determine the appropriate quadrant. For example, Q1, in which suspension system 432 is controlled by suspension control 431 could be the right front wheel; Q2, in which suspension system 442 is controlled by suspension control 441 could be the left front wheel; Q3, in which suspension system 452 is controlled by suspension control 451 could be the right rear wheel; and Q4, in which suspension system 462 is controlled by suspension control 461 could be the left rear wheel. Of course, other orderings are possible, as are systems with only two independent zones, e.g. two sides are controlled in lockstep.

In other embodiments, simple lateral acceleration is provided to a suspension control system.

Example 8: System for Turning Off an Idling Engine

Figure 10:
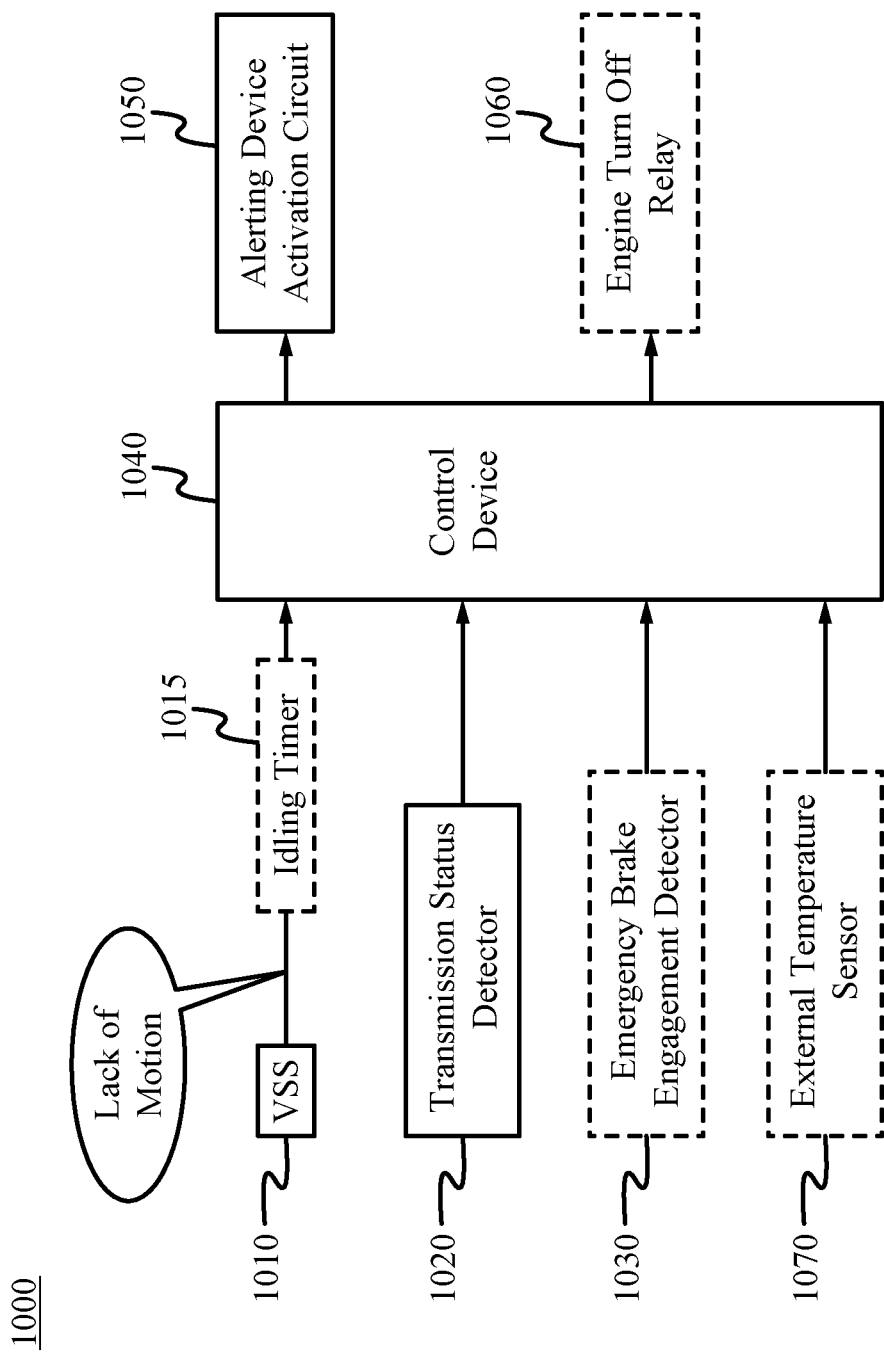
FIG. 10 is a schematic view illustrating the components of a vehicle monitoring system, warning drivers of a subject vehicle's stationary status and turning off an idling engine, in accordance with some embodiments of the present invention.

In further embodiments, a vehicle speed sensor (VSS) 1010 such as described above, is configured to sense a lack of motion of a vehicle. FIG. 10 is a schematic view illustrating the components of a vehicle monitoring system 1000, warning other drivers of the stationary status of a vehicle and turning off the engine after the vehicle has been stationary for a period of time. The vehicle monitoring system 1000 comprises a VSS 1010, an idling timer 1015, a transmission status detector 1020 and a control device 1040. In some embodiments, the idling timer 1015 is a distinct microprocessor coupled to the VSS 1010 and the control device 1040. In some embodiments, the idling timer 1015 is a microprocessor comprised within the control device 1040. The VSS 1010 emits a periodic function with a frequency corresponding to a motion status of the vehicle and sends a signal to the idling timer 1015 or the control device 1040. The transmission status detector 1020 is also coupled to the control device 1040 and detects whether the transmission is in park or neutral and sends a signal to the control device 1040, as indicated above. In some embodiments, the system comprises an emergency brake detector 1030, which is coupled to the control device 1040 and sends a signal to the control device 1040 corresponding to the engagement of the emergency brake. In some embodiments, the system comprises an external temperature sensor 1070, which is coupled to the control device 1040 and sends a signal to the control device corresponding to the temperature of the external operating environment. In some embodiments, the control device 1040 only turns off the vehicle if the external temperature is above a programmed value. In some embodiments, the external temperature sensor 1070 only sends a signal if the external temperature is above a programmed value.

After receiving a signal that the vehicle is stationary, the control device 1040 activates an alerting device to signal to other drivers that the vehicle is stationary and the idling timer 1015 is also activated. In some embodiments, the alerting device is a rear facing amber light, which warns following vehicles of the stationary status of the subject vehicle. In some embodiments, the idling timer 1015 is a microprocessor comprised within the control device 1040 such that the control device activates the timer. Once the timer reaches a pre-programmed period, the idling timer 1015 sends a signal to the control device 1040. The control device 1040 processes the input signal it receives from the idling timer 1015 and the transmission status detector 1020 and decides whether to turn off the engine of the vehicle. In some embodiments, the control device 1040 only turns off the vehicle if the vehicle is stationary and the transmission is in park. In some embodiments, the emergency brake engagement detector 1030 additionally sends a signal to the control device 1040. In these embodiments, the control device 1040 only turns off the vehicle if the emergency brake is additionally engaged, although the transmission may be in park or neutral. In further embodiments, the external temperature sensor 1070 sends a signal to the control device 1040. In these embodiments, the control device 1040 only turns off the vehicle if the external temperature is above a programmed value. In some embodiments, the external temperature sensor 1070 only sends a signal if the external temperature is above a programmed value.

The idling timer 1015, is configured to send a de-activation signal after the timer has reached the end of its pre-programmed period. In some embodiments, the idling timer 1015 is configured to reach the end of its pre-programmed period after some predetermined period of time, such as 1, 3, 6 or 9 minutes. In other embodiments, the idling timer 1015 is configured to reach its pre-programmed period of time after some other period of time.

After the idling timer 1015 has reached the end of its pre-programmed period of time, a variety of signals and types of signals are sent to turn off the engine. In some embodiments, a logic high or logic low signal is sent directly to the control device 1040, which turns off the engine. In other embodiments, a 12V signal is sent to a relay which resides in series with the ignition system. Receiving the 12V signal activates the relay and disengages the ignition. In further embodiments, additional signals are sent to relays or other such devices to turn off a lighting system or other accessory equipment.

In some embodiments, additional safety features such as redundant queries confirming "park-status" are included. The safety features include querying emergency brake status, transmission engagement status and foot-pedal brake status. In these embodiments, signals to turn off the engine are delayed until such "park-status" is confirmed.

Figure 11:
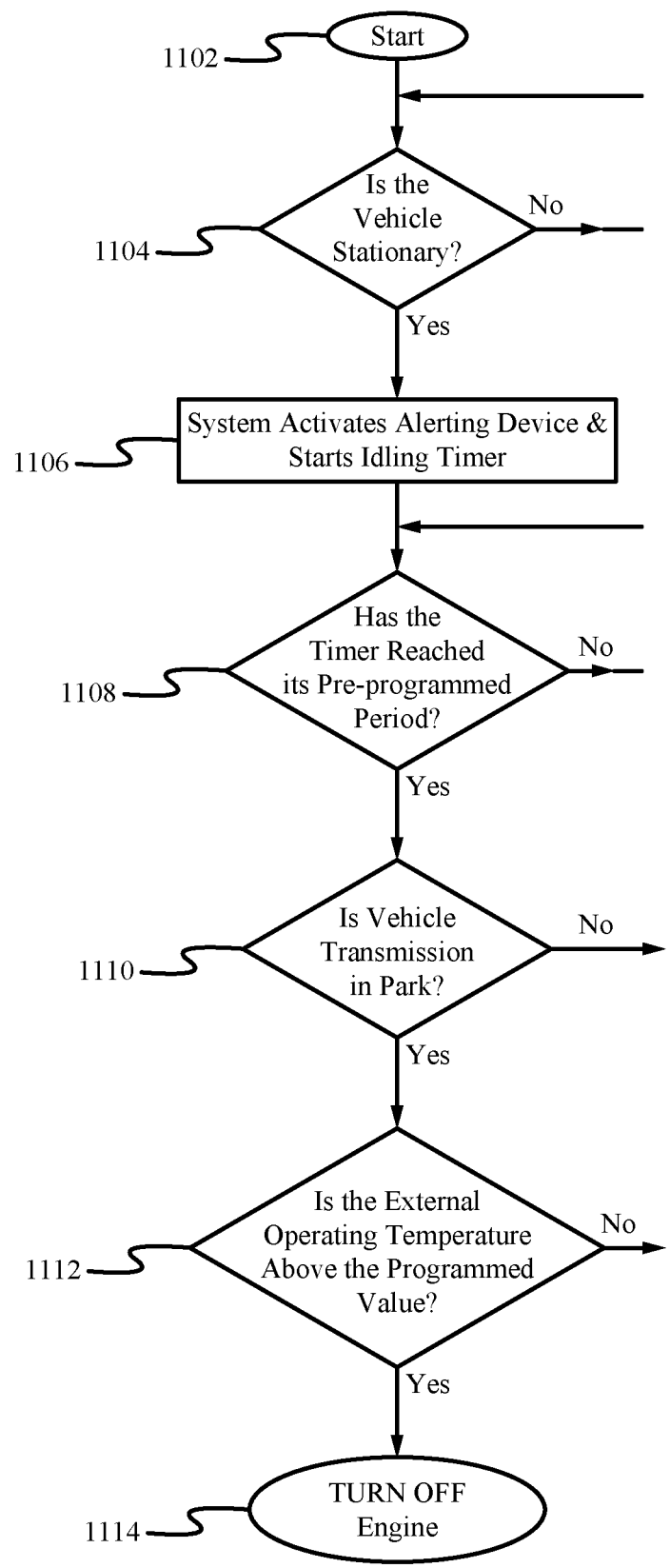
FIG. 11 illustrates a flow chart of a system to automatically turn off an idling engine in accordance with some embodiments of the present invention.

FIG. 11 illustrates the process used to turn off an idling vehicle. The process of FIG. 11 starts at the step 1102. At the step 1104, the system determines whether the vehicle is stationary based on output from the VSS. If the vehicle is stationary, then at the step 1106, an alerting device to warn following vehicles of the stationary status and an idling timer are activated. As discussed above, the idling timer 1015 is configured to run for a pre-programmed period of time. At the step 1108, the system determines whether the idling timer 1015 has run for its pre-programmed period. In some embodiments, the idling timer 1015 sends a signal to the control device 1040 when it has run for its pre-programmed period. If the timer has reached the end of its pre-programmed period, then the system proceeds to the step 1110. At the step 1110, the system queries the vehicle's transmission status based on input from the transmission status detector 1020 to the control device 1040 (FIG. 10). In some embodiments, the system queries whether the vehicle's transmission is in park. In some embodiments, the system queries whether the vehicle's transmission is in neutral or park. When the system queries whether the vehicle's transmission is in neutral, the system also queries whether the emergency brake is engaged based on input from the emergency brake engagement detector 1030 to the control device 1040 (FIG. 10). In further embodiments, the system separately queries whether the emergency brake is engaged based on input from the emergency brake engagement detector 1030 to the control device 1040. If at the step 1110 the vehicle's transmission is in park, then the system proceeds to the step 1112. At the step 1112, the system queries the temperature of the external operating environment. If at the step 1112, the temperature is at or below the programmed temperature, then a signal is not sent to turn off the engine and the engine is allowed to idle. The engine is allowed to idle such that a taxi-driver or other vehicle operator is able to allow the vehicle to run on a cold day while they are waiting for a fare or in other comparable situations. If at the step 1112, the temperature is above the programmed temperature, a signal is sent to turn off the engine and the process ends at the step 1114. In some embodiments, additional signals are sent at the step 1114 to relays or other such devices to turn off a lighting system or other accessory equipment.

In some embodiments, the process illustrated in FIG. 11 further comprises redundant queries confirming the "park-status" of the vehicle. These include querying the emergency brake status, querying the transmission engagement status and querying the foot-pedal brake status. In these embodiments, a signal sent to turn off the engine is delayed until such "park-status" is confirmed.

Embodiments of the invention provide the driver of a subject vehicle a system that causes an idling engine to turn off whose vehicle has been stationary for more than a certain amount of time, whose transmission is in park or neutral with the emergency brake activated and where the outside temperature is above a threshold value. The system is able to selectively turn off an engine according to the outside temperature and a pre-programmed time period of engine idle.

Thus, the invention is able to automatically turn off an idling engine after a variety of different time periods and at a variety of different temperatures. This is advantageous over most modern vehicles which must be manually turned off and then restarted by the vehicle's operator. A novel and unique way for corporate and governmental fleet operations as well as individual operators to save money and prevent undue environmental pollution caused by engine idle is described herein.

Example 9: Communication System for a Vehicle

In another aspect, a communication system communicates the approach of an oncoming vehicle. A communication system for a vehicle comprises a mechanism for sensing a change in speed of the vehicle and a control device for sending a signal to a headlight activation circuit to modulate the vehicle's headlights based upon the change in speed. In particular, a headlight of the vehicle is able to be modulated as the vehicle reduces speed and/or is decelerating as it approaches an intersection. Additionally, the headlight of the vehicle is able to be modulated as the vehicle accelerates from a stopped position or reaches a certain traveling speed. The headlight activation circuit is able to modulate the headlight between an on position and an off position or modulate the headlight between a high beam position and a low beam position. Consequently, the vehicle is better seen as it approaches likely congestion areas such as intersections and slowing or stopped traffic and attempts to enter traffic. In some embodiments, the vehicle comprises a motorcycle.

Figure 19:
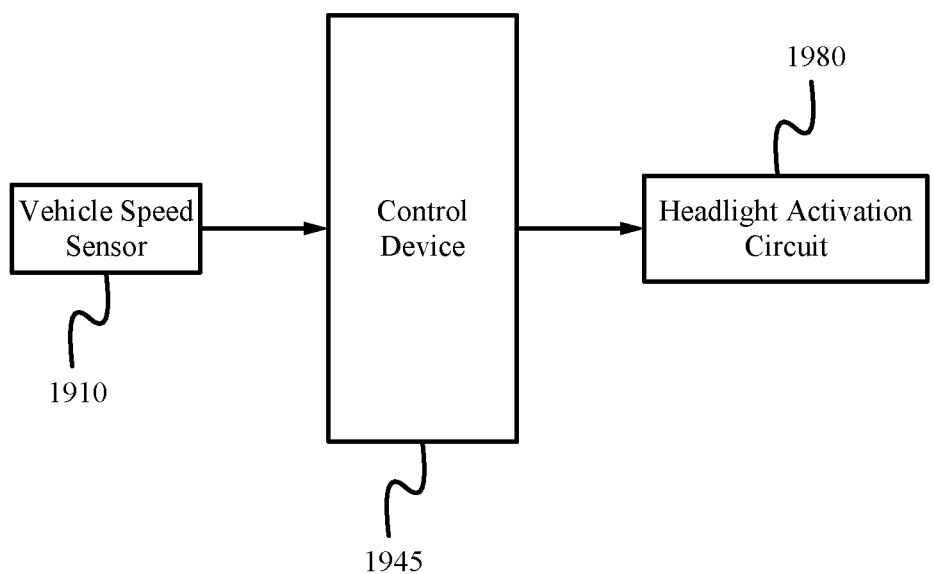
FIG. 19 illustrates a communication system for a motorcycle, in accordance with some embodiments.

Referring now to FIG. 19, a communication system 1900 for a vehicle is depicted therein. The communication system 1900 comprises a vehicle speed sensor 1910 for sensing a traveling speed of the vehicle, a control device 1945 and a headlight activation circuit 1980. The control device 1945 receives a signal from the vehicle speed sensor 1910 and sends a signal to the headlight activation circuit 1980 based upon the signal from the vehicle speed sensor 1910. The headlight activation circuit 1980 is able to activate and modulate a headlight of the vehicle based upon the signal from the control device 1945. For example, in some embodiments, the control device 1945 sends a signal to the headlight activation circuit 1980 to modulate the headlight of the vehicle between an on position and an off position. Alternatively, in some embodiments, the control device 1945 sends a signal to the headlight activation circuit 1980 to modulate the headlight of the vehicle between a high beam and a low beam position. The communication system 1900 is able to be installed on the vehicle during manufacturing as original equipment or as an aftermarket system. In some embodiments, the communication system 1900 is installed on a motorcycle.

In some embodiments, the vehicle speed sensor sends 1910 sends a signal to the control device 1945 that the vehicle has reached a defined speed and in response the control device 1945 sends a signal to the headlight activation circuit 1980 to modulate a headlight of the vehicle. For example, in some embodiments, the vehicle speed sensor 1910 sends a signal to the control device 1945 that the vehicle has reached a highway speed of 55 mph and in response the control device 1945 sends a signal to the headlight activation circuit 1980 to modulate a headlight of the vehicle. The headlight activation circuit 1980 is able to modulate the headlight at a rate corresponding to the speed of the vehicle. Particularly, as the speed of the vehicle increases, the control device 1945 is able to send a signal to the headlight activation circuit 1980 to modulate the vehicle headlight at an increased rate. In this manner, the vehicle is able to indicate that it is approaching an area and at a certain speed.

In some embodiments, the vehicle speed sensor sends 1910 sends a signal to the control device 1945 that the vehicle has slowed to a defined speed and in response the control device 1945 sends a signal to the headlight activation circuit 1980 to modulate a headlight of the vehicle. For example, in some embodiments, the vehicle speed sensor 1910 sends a signal to the control device 1945 that the vehicle has increased its speed to greater than 15 mph. Then, when the vehicle slows to a speed less than 15 mph, the control device 1945 sends a signal to the headlight activation circuit 1980 to modulate a headlight of the vehicle. Consequently, the vehicle is able to be better seen as it slows when approaching an intersection or slowing and/or stopped traffic. Particular, as described above, the communication system 1900 is able to modulate the headlights of the vehicle at a variety of different speeds in order to indicate that the vehicle is approaching an area.

Figure 20:
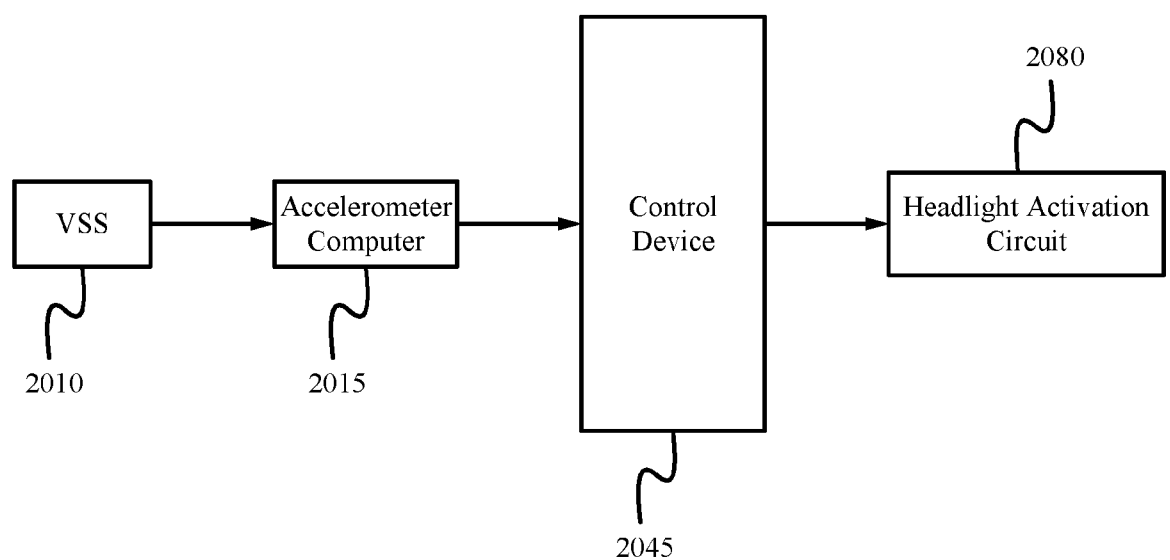
FIG. 20 illustrates a communication system for a motorcycle, in accordance with some embodiments.

FIG. 20 illustrates a communication system 2000 for a vehicle utilizing a vehicle speed sensor 2010 and an acceleration monitoring system 2015. As shown in FIG. 20, the communication system 2000 comprises a vehicle speed sensor 2010, an acceleration monitoring system 2015, a control device 2045 and a headlight activation circuit 2080. The vehicle speed sensor 2010 detects a speed of the vehicle and sends a signal to the acceleration monitoring system 2015 which is able to calculate an acceleration or deceleration of the vehicle based upon the variation in the signals from the vehicle speed sensor 2010. The acceleration monitoring system 2015 sends a signal to the control device 2045 and the control device sends a signal to the headlight activation circuit 2080 based upon the signal from the acceleration monitoring system 2015.

In some embodiments, the acceleration monitoring system 2015 sends a signal to the control device 2045 that the vehicle is decelerating and in response the control device 2045 sends a signal to the headlight activation circuit 2080 to modulate a headlight of the vehicle. The headlight activation circuit 2080 is able to modulate the headlight at a rate corresponding to the deceleration speed of the vehicle. In some embodiments, the acceleration monitoring system 2015 sends a signal to the control device 2045 that the vehicle is accelerating and in response the control device 2045 sends a signal to the headlight activation circuit 2080 to modulate a headlight of the vehicle. For example, in some embodiments, the acceleration monitoring system 2015 sends a signal to the control device 2045 that the vehicle is accelerating from a stopped position such as from a stop sign or a red light and in response the control device 2045 sends a signal to the headlight activation circuit 2080 to modulate a headlight of the vehicle.

When modulating the headlight of the vehicle as it decelerates, the vehicle is able to be better seen as it slows when approaching an intersection or slowing and/or stopped traffic. Additionally, modulating the headlight as the vehicle accelerates from the stopped position enables the vehicle to be better seen as it enters traffic and/or begins to travel from a stopped position. Similarly to the communication system 1900 as described above, the communication system 2000 is able to be installed on the vehicle during manufacturing as original equipment or as an aftermarket system. In some embodiments, the communication system 2000 is installed on a motorcycle.

Figure 21:
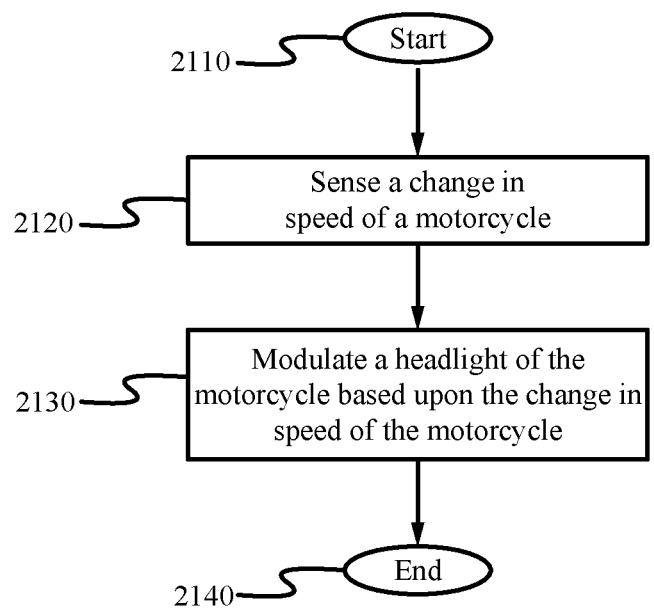
FIG. 21 illustrates a communication method for a motorcycle, in accordance with some embodiments.

FIG. 21 illustrates a method of modulating a vehicle headlight in accordance to some embodiments. The method begins in the step 2110. In the step 2120 a change in speed of the vehicle is sensed. For example, in some embodiments, it is sensed that the vehicle is decelerating and/or slowing down. Alternatively, in some embodiments, it is sensed that the vehicle has reached a defined traveling speed or has accelerated from a stopped position. Then, in the step 2130, the headlight of the vehicle is modulated based upon the change in speed. In some embodiments, the headlight is modulated between an on position and an off position. In some embodiments, the headlight is modulated between a high beam position and a low beam position. The method ends in the step 2140.

Figure 22:
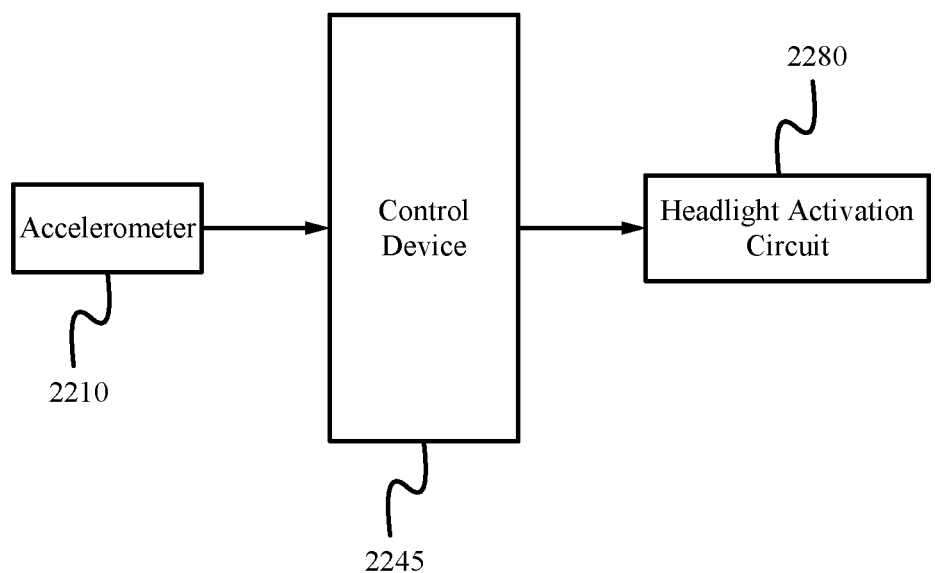
FIG. 22 illustrates a communication system for a motorcycle, in accordance with some embodiments.

FIG. 22 illustrates a communication system 2200 for a vehicle utilizing an accelerometer 2210. As shown in FIG. 22, the communication system 2200 comprises an accelerometer 2210, a control device 2245 and a headlight activation circuit 2280. The accelerometer detects an acceleration or deceleration of the vehicle and sends a signal to the control device 2245 and the control device sends a signal to the headlight activation circuit 2280 based upon the signal from the accelerometer 2210.

In some embodiments, the accelerometer 2210 sends a signal to the control device 2245 that the vehicle is decelerating and in response the control device 2245 sends a signal to the headlight activation circuit 2280 to modulate a headlight of the vehicle. The headlight activation circuit 2280 is able to modulate the headlight at a rate corresponding to the deceleration speed of the vehicle. In some embodiments, the accelerometer 2210 sends a signal to the control device 2245 that the vehicle is accelerating and in response the control device 2245 sends a signal to the headlight activation circuit 2280 to modulate a headlight of the vehicle. For example, in some embodiments, the accelerometer 2210 sends a signal to the control device 2245 that the vehicle is accelerating from a stopped position such as from a stop sign or a red light and in response the control device 2245 sends a signal to the headlight activation circuit 2280 to modulate a headlight of the vehicle.

When modulating the headlight of the vehicle as it decelerates, the vehicle is able to be better seen as it slows when approaching an intersection or slowing and/or stopped traffic. Additionally, modulating the headlight as the vehicle accelerates from the stopped position enables the vehicle to be better seen as it enters traffic and/or begins to travel from a stopped position. Similarly to the communication systems 1900 and 2000 as described above, the communication system 2200 is able to be installed on the vehicle during manufacturing as original equipment or as an aftermarket system. In some embodiments, the communication system 2200 is installed on a motorcycle.

Figure 23:
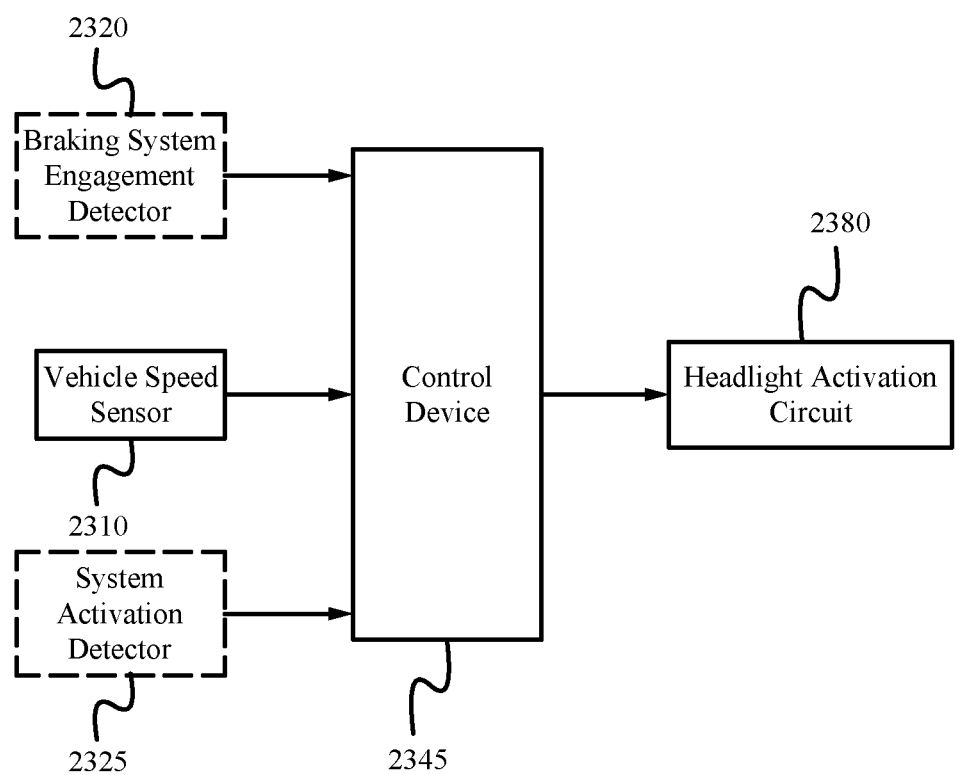
FIG. 23 illustrates a communication system for a motorcycle, in accordance with some embodiments.

As shown in FIG. 23, in some embodiments the communication system comprises one or more of a braking system engagement detector 2320 and a system activation detector 2325. The communication system 2300 comprises a vehicle speed sensor 2310 for sensing a traveling speed of the vehicle, a braking system engagement detector 2320 for detecting an engagement of the braking system, a system activation detector 2325 for detecting whether the system has been activated, a control device 2345 and a headlight activation circuit 2380. The control device 2345 receives a signal from the vehicle speed sensor 2310, the braking system engagement detector 2320, and the system activation detector 2325 and sends a signal to the headlight activation circuit 2380 based upon the signal from the vehicle speed sensor 2310, the braking system engagement detector 2320, and the system activation detector 2325. The headlight activation circuit 2380 is able to activate and modulate a headlight of the vehicle based upon the signal from the control device 2345.

In some embodiments, the braking system engagement detector 2320 sends a signal to the control device 2345 that the braking system has been activated. For example, if the communication system is implemented in a motorcycle, the braking system engagement detector 2320 sends a signal that the brake pedal or lever has been depressed and in response the control device 2345 sends a signal to the headlight activation circuit 2380 to activate the headlight.

The system activation detector 2325 detects that the system has been activated and sends a signal to the control device 2345. In some embodiments, the control device 2345 only sends a signal to the headlight activation circuit 2380 to activate the headlight if it is determined that the communication system 2300 has been turned on. The system 2300 is able to be turned on by any conventional and appropriate manner. For example, in some embodiments, the communication system 2300 is turned on by a button or a switch located within a vehicle. In some embodiments, the system 2300 is automatically activated when the vehicle is turned on and is optionally turned off by the button or a switch within the vehicle. Consequently, the system is able to be turned on and off as desired by the user.

In some embodiments, the control device receives a signal that the vehicle is changing its speed, the braking system has been activated and/or a signal that the system had been turned on and sends a signal to the headlight activation circuit 2380 to activate the headlight(s). As described in relation to the communication systems above, the control device 2345 sends a signal to the headlight activation circuit 2380 to modulate the headlight of the vehicle between an on position and an off position. Alternatively, in some embodiments, the control device 2345 sends a signal to the headlight activation circuit 2380 to modulate the headlight of the vehicle between a high beam and a low beam position. The communication system 2300 is able to be installed on the vehicle during manufacturing as original equipment or as an aftermarket system. In some embodiments, the communication system 2300 is installed on a motorcycle. Particularly, the system 2300 is able to operate similarly to those described above.

Figure 24:
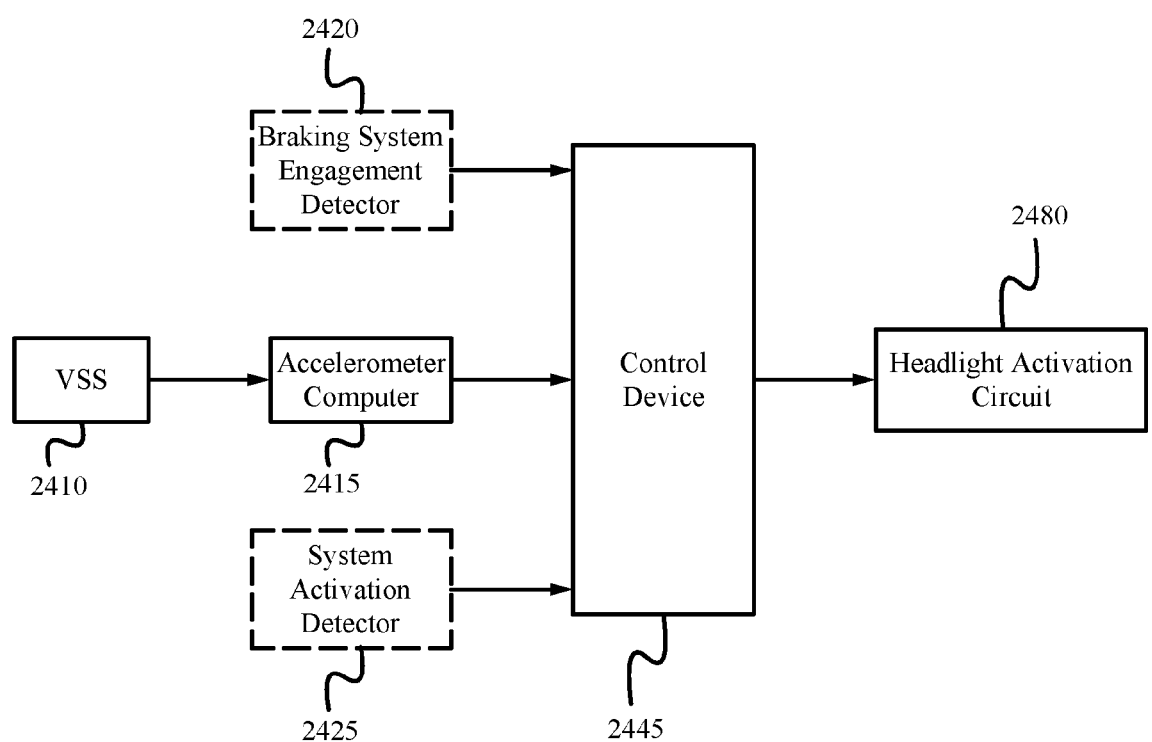
FIG. 24 illustrates a communication system for a motorcycle, in accordance with some embodiments.

FIG. 24 illustrates a communication system 2400 for a vehicle utilizing a vehicle speed sensor 2410 and an acceleration monitoring system 2415. As shown in FIG. 24, the communication system 2400 comprises a vehicle speed sensor 2410, an acceleration monitoring system 2415, a braking system engagement detector 2320, a system activation detector 2325, a control device 2345, and a headlight activation circuit 2380.

The vehicle speed sensor 2410 detects a speed of the vehicle and sends a signal to the acceleration monitoring system 2415 which is able to calculate an acceleration or deceleration of the vehicle based upon the variation in the signals from the vehicle speed sensor 2410. The acceleration monitoring system 2415 sends a signal to the control device 2445 and the control device sends a signal to the headlight activation circuit 2480 based upon the signal from the acceleration monitoring system 2415. As described above, the braking system engagement detector 2420 sends a signal to the control device 2445 based upon an engagement of the braking system and the system activation detector 2425 sends a signal to the control device 2445 based upon whether the system has been activated.

In some embodiments, the acceleration monitoring system 2415 sends a signal to the control device 2445 that the vehicle is decelerating and in response the control device 2445 sends a signal to the headlight activation circuit 2480 to modulate a headlight of the vehicle. The headlight activation circuit 2480 is able to modulate the headlight at a rate corresponding to the deceleration speed of the vehicle. In some embodiments, the acceleration monitoring system 2415 sends a signal to the control device 2445 that the vehicle is accelerating and in response the control device 2445 sends a signal to the headlight activation circuit 2480 to modulate a headlight of the vehicle.

In some embodiments, the braking system engagement detector 2420 sends a signal to the control device 2445 that the braking system has been activated. For example, if the communication system is implemented in a motorcycle, the braking system engagement detector 2420 sends a signal that the brake pedal or lever has been depressed and in response the control device 2445 sends a signal to the headlight activation circuit 2480 to activate the headlight.

The system activation detector 2425 detects that the system has been activated and sends a signal to the control device 2445. In some embodiments, the control device 2445 only sends a signal to the headlight activation circuit 2480 to activate the headlight if it is determined that the communication system 2400 has been turned on. The system 2400 is able to be turned on by any conventional and appropriate manner. For example, in some embodiments, the communication system 2400 is turned on by a button or a switch located within a vehicle. In some embodiments, the system 2400 is automatically activated when the vehicle is turned on and is optionally turned off by the button or a switch within the vehicle. Consequently, the system is able to be turned on and off as desired by the user.

In some embodiments, the control device receives a signal that the vehicle is changing its speed, the braking system has been activated and/or a signal that the system had been turned on and sends a signal to the headlight activation circuit 2480 to activate the headlight(s). As described in relation to the communication systems above, the control device 2445 sends a signal to the headlight activation circuit 2480 to modulate the headlight of the vehicle between an on position and an off position. Alternatively, in some embodiments, the control device 2445 sends a signal to the headlight activation circuit 2480 to modulate the headlight of the vehicle between a high beam and a low beam position. The communication system 2400 is able to be installed on the vehicle during manufacturing as original equipment or as an aftermarket system. In some embodiments, the communication system 2400 is installed on a motorcycle. Particularly, the system 2400 is able to operate similarly to those described above.

Figure 25:
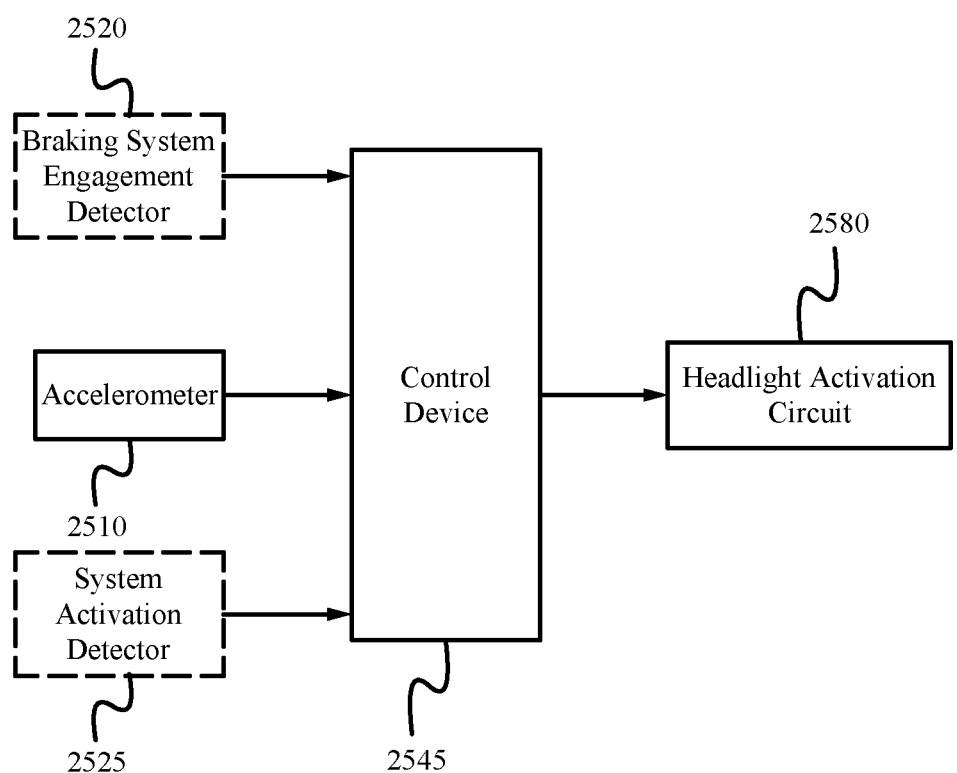
FIG. 25 illustrates a communication system for a motorcycle, in accordance with some embodiments.

FIG. 25 illustrates a communication system 2500 for a vehicle utilizing an accelerometer 2550. As shown in FIG. 25, the communication system 2500 comprises an accelerometer 2550, a control device 2545 and a headlight activation circuit 2580. The accelerometer detects an acceleration or deceleration of the vehicle and sends a signal to the control device 2545 and the control device sends a signal to the headlight activation circuit 2580 based upon the signal from the accelerometer 2550. As described above, the braking system engagement detector 2520 sends a signal to the control device 2545 based upon an engagement of the braking system and the system activation detector 2525 sends a signal to the control device 2545 based upon whether the system has been activated.

In some embodiments, the braking system engagement detector 2520 sends a signal to the control device 2545 that the braking system has been activated. For example, if the communication system is implemented in a motorcycle, the braking system engagement detector 2520 sends a signal that the brake pedal or lever has been depressed and in response the control device 2545 sends a signal to the headlight activation circuit 2580 to activate the headlight.

The system activation detector 2525 detects that the system has been activated and sends a signal to the control device 2545. In some embodiments, the control device 2545 only sends a signal to the headlight activation circuit 2580 to activate the headlight if it is determined that the communication system 2500 has been turned on. The system 2500 is able to be turned on by any conventional and appropriate manner. For example, in some embodiments, the communication system 2500 is turned on by a button or a switch located within a vehicle. In some embodiments, the system 2500 is automatically activated when the vehicle is turned on and is optionally turned off by the button or a switch within the vehicle. Consequently, the system is able to be turned on and off as desired by the user.

In some embodiments, the control device receives a signal that the vehicle is changing its speed, the braking system has been activated and/or a signal that the system had been turned on and sends a signal to the headlight activation circuit 2580 to activate the headlight(s). As described in relation to the communication systems above, the control device 2545 sends a signal to the headlight activation circuit 2580 to modulate the headlight of the vehicle between an on position and an off position. Alternatively, in some embodiments, the control device 2545 sends a signal to the headlight activation circuit 2580 to modulate the headlight of the vehicle between a high beam and a low beam position. The communication system 2500 is able to be installed on the vehicle during manufacturing as original equipment or as an aftermarket system. In some embodiments, the communication system 2500 is installed on a motorcycle. Particularly, the system 2500 is able to operate similarly to those described above.

Figure 26:
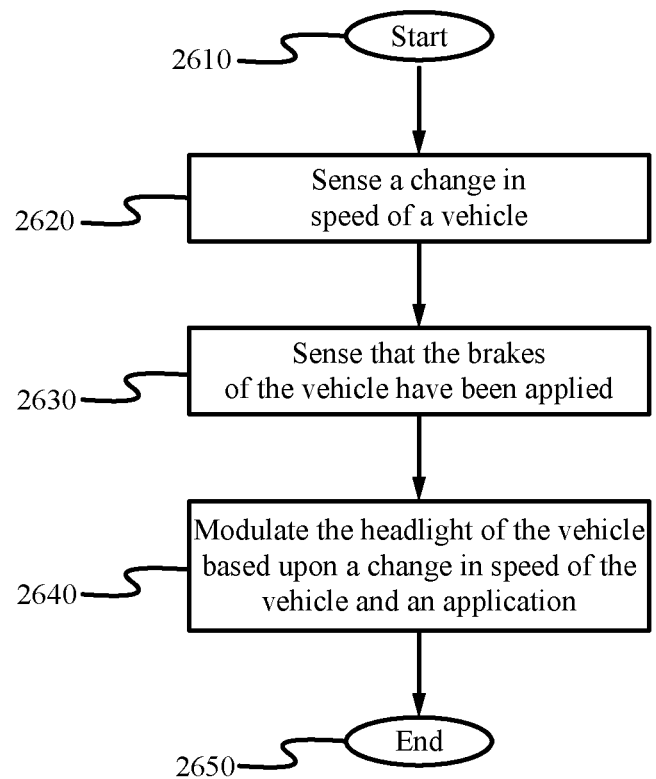
FIG. 26 illustrates a communication method for a motorcycle, in accordance with some embodiments.

FIG. 26 illustrates a method of modulating a headlight in accordance with some embodiments. The method starts in the step 2610. In the step 2620 a change in a speed of a vehicle is sensed. As described above, in some embodiments it is sensed that the vehicle has slowed to a certain speed. In the step 2630, it is then sensed whether the brakes of the vehicle have been applied. Then, in the step 2640 the headlights of the vehicle are modulated based upon the change in speed of the vehicle and the application of the brakes. As described in relation to the communication systems above, in some embodiments, the headlight of the vehicle is modulated between an on position and an off position. Alternatively, in some embodiments, the headlight is modulated between a high beam and a low beam position. In some embodiments, the method is implemented within a motorcycle. In the step 2650, the method ends.

Figure 27:
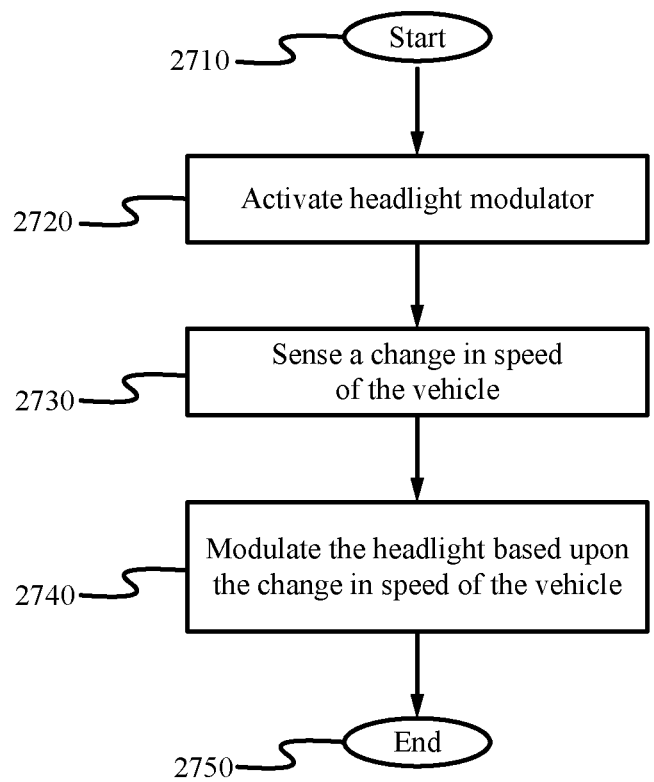
FIG. 27 illustrates a communication method for a motorcycle, in accordance with some embodiments.

FIG. 27 illustrates a method of modulating a headlight in accordance with further embodiments. The method begins in the step 2710. In the step 2720 the headlight modulator is activated. As described above, in some embodiments a button or lever is depressed in order to activate the modulator. Alternatively, in some embodiments the headlight modulator is automatically activated when the vehicle is started and is able to be turned off by depressing the button or lever. In the step 2730 a change in speed of the vehicle is sensed. For example, in some embodiments, it is sensed that the vehicle has slowed to a certain speed. Alternatively, in some embodiments, it is sensed that the vehicle has begun to move after being stopped. In some embodiments, it is sensed whether the brakes of the vehicle have been applied. Then, in the step 2740, the headlight of the vehicle are modulated based upon the change in speed of the vehicle. As described in relation to the communication systems above, in some embodiments, the headlight of the vehicle is modulated between an on position and an off position. Alternatively, in some embodiments, the headlight is modulated between a high beam and a low beam position. In some embodiments, the method is implemented within a motorcycle. In the step 2750, the method ends.

A system for modulating a headlight of a vehicle comprises a mechanism for sensing a change in the traveling speed of the vehicle, a control device and a headlight activation circuit for activating a headlight of the vehicle. The control device receives a signal that the traveling speed of the vehicle has changed and activates and modulates a headlight of the vehicle. For example, in some embodiments, it is sensed that the vehicle is decelerating and/or slowing down. Alternatively, in some embodiments, it is sensed that the vehicle has reached a defined traveling speed or has accelerated from a stopped position. The headlight is modulated between an on position and an off position or between a high beam position and a low beam position.

Figure 28:
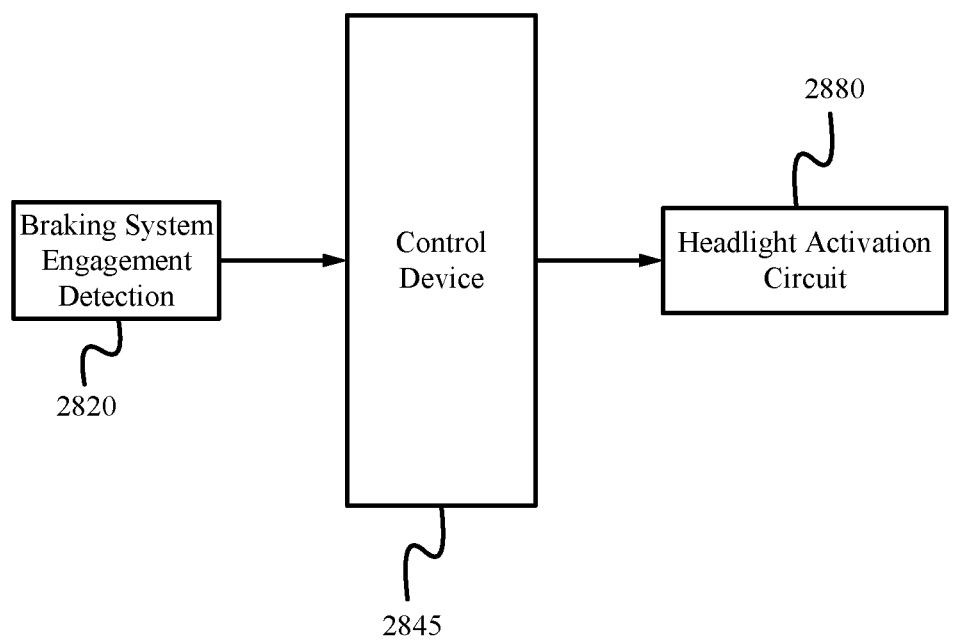
FIG. 28 illustrates a communication system for a vehicle, in accordance with some embodiments.

In some embodiments, a communication system for modulating a headlight, such as described above, comprises a braking system activation detector detects an engagement of one of a front brake circuit and a rear brake circuit. As shown within FIG. 28, a communication system for a vehicle 2800 comprises a braking system activation detector 2820, a control device 2845 and a headlight activation circuit 2880. The braking system activation detector 2820 detects an engagement of one of a front brake circuit and a rear brake circuit and sends a signal to the control device 2845. The control device 2845 processes the signal from the braking system activation detector 2820 and sends a signal to the headlight activation circuit. In some embodiments, the communication system 2800 is implemented within a motorcycle.

In some embodiments, where the communication system 2800 is implemented within a motorcycle, the braking system engagement detector 2820 sends a signal that a brake pedal or a brake lever has been depressed and in response the control device 2845 sends a signal to the headlight activation circuit 2880 to activate the headlight.

As described in relation to the communication systems above, the control device 2845 sends a signal to the headlight activation circuit 2880 to modulate the headlight of the vehicle between an on position and an off position. Alternatively, in some embodiments, the control device 2845 sends a signal to the headlight activation circuit 2880 to modulate the headlight of the vehicle between a high beam and a low beam position. The communication system 2800 is able to be installed on the vehicle during manufacturing as original equipment or as an aftermarket system. In some embodiments, the communication system 2800 is installed on a motorcycle. Particularly, the system 2800 is able to operate similarly to those described above.

Figure 29:
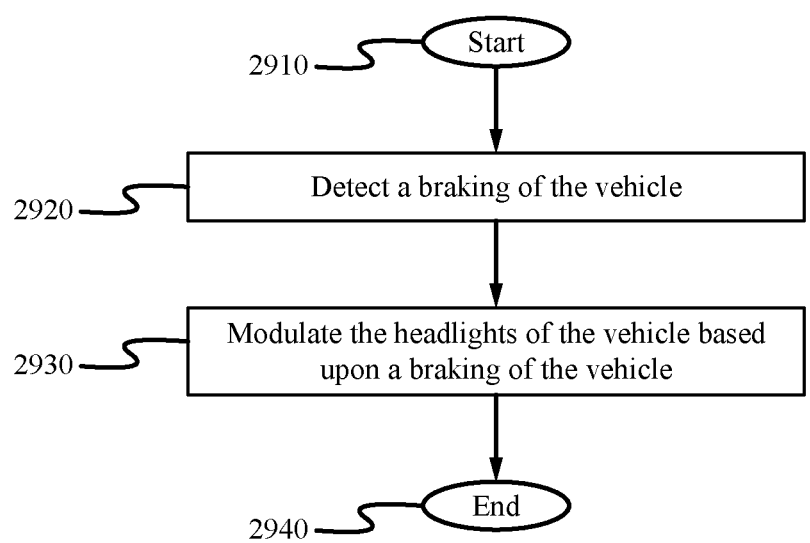
FIG. 29 illustrates a communication method for a vehicle, in accordance with some embodiments.

FIG. 29 illustrates a method of modulating a headlight in accordance with some embodiments. The method starts in the step 2910. In the step 2920 it is detected whether the brakes of the vehicle have been applied. For example, in some embodiments, it is detected that one or both of the front brake and the back brake has been activated. Then, in the step 2930, the headlights of the vehicle are modulated based upon the application of the brakes. As described in relation to the communication systems above, in some embodiments, the headlight of the vehicle is modulated between an on position and an off position. Alternatively, in some embodiments, the headlight is modulated between a high beam and a low beam position. In some embodiments, the method is implemented within a motorcycle. In the step 2940, the method ends.

In use, a communication system for a vehicle enables a vehicle to increase its visibility and therefore announce when it is entering or traveling through an area. Particularly, by modulating a headlight of the vehicle as the vehicle slows and/or decelerates and comes to a stop the vehicle is able to signal as it approaches a likely congestion and less safe traveling area such as an intersection and slowing and/or stopped traffic. Additionally, when the headlight is modulated as the vehicle accelerates the vehicle is able to indicate and become more visible as it enters traffic and/or begins to move from a stop such as at an intersection or stoplight. Particularly, the headlight is only modulated when it is need and the rest of the time remains dormant. As such it provides a greater contrast and more specific warning that the vehicle has entered an area. The communication system is additionally able to be installed on a motorcycle which may otherwise be less visible to a motorist. Consequently, the communication system for modulating a vehicle as described herein has many advantages.

Of course, the present invention has additional uses that are not discussed in the embodiments above. The present invention has been described in terms of specific embodiments incorporating details to facilitate the understanding of the principles of construction and operation of the invention.

As such, references herein to specific embodiments and details thereof are not intended to limit the scope of the claims appended hereto. It will be apparent that those skilled in the art that modifications can be made to the embodiments chosen for illustration without departing from the spirit and scope of the invention.

We claim:

1. A communication system for a vehicle comprising:
 a. a braking system engagement detector;
 b. a control device; and
 c. a headlight activation circuit for activating a headlight, wherein the control device receives a signal from the braking engagement detector and sends a signal to the headlight activation circuit to operate the headlight based upon the signal from the braking engagement detector, wherein the control device sends a signal to activate the headlight as the vehicle accelerates after activation of the brakes, and further wherein the control device sends a signal to the headlight activation circuit to modulate the headlight when a brake engagement is detected and the vehicle slows to a defined speed.

2. A method of modulating a vehicle headlight comprising:
 a. detecting that a brake of the vehicle has been applied; and
 b. modulating a headlight of the vehicle based upon the application of the brake, wherein the headlight is modulated as the vehicle accelerates after activation of the brakes, and further wherein a control device sends a signal to a headlight activation circuit to modulate the headlight when a brake engagement is detected and the vehicle slows to a defined speed.

3. A communication system for a vehicle comprising:
 a. a control device; and
 b. a headlight activation circuit for activating a headlight, wherein the control device sends a signal to activate the headlight as the vehicle accelerates after activation of brakes of the vehicle, and further wherein the control device sends a signal to the headlight activation circuit to modulate the headlight when a brake engagement is detected and the vehicle slows to a defined speed.

4. The communication system of claim 1 wherein the control device sends a signal to the headlight activation circuit to modulate the headlight when a brake engagement is detected and the vehicle slows to a defined speed.

5. The communication system of claim 1 wherein the communication system is installed as aftermarket-equipment.

6. The communication system of claim 1 wherein the vehicle comprises a motorcycle.

7. A method of modulating a vehicle headlight comprising:
 a. detecting that a brake of the vehicle has been applied; and
 b. modulating a headlight of the vehicle based upon the application of the brake, wherein the headlight is modulated as the vehicle accelerates after activation of the brakes.

8. The method of claim 7 comprising detecting an engagement of one or both of a front brake and a rear brake.

9. The method of claim 7 the headlight is modulated between an on position and an off position.

10. The method of claim 7 wherein the headlight is modulated between a high beam and a low beam position.

11. The method of claim 7 wherein the headlight is modulated at a rate corresponding to the speed of the vehicle.

12. The method of claim 7 wherein a control device sends a signal to the headlight activation circuit to modulate the headlight a when a brake engagement is detected and the vehicle slows to a defined speed.

13. The method of claim 7 wherein the method is implemented within an aftermarket system.

14. The method of claim 7 wherein the vehicle comprises a motorcycle.

15. A communication system for a vehicle comprising:
 a. a control device; and
 b. a headlight activation circuit for activating a headlight, wherein the control device sends a signal to activate the headlight as the vehicle accelerates after activation of brakes of the vehicle.

16. The communication system of claim 15 wherein the headlight activation circuit modulates the headlight between an on position and an off position.

17. The communication system of claim 15 wherein the headlight activation circuit modulates the headlight between a high beam and a low beam position.

18. The communication system of claim 15 wherein the headlight is modulated at a rate corresponding to the speed of the vehicle.

19. The communication system of claim 15 wherein the vehicle comprises a motorcycle.

* * * * *